(12) United States Patent
Mitra et al.

(10) Patent No.: US 11,860,880 B2
(45) Date of Patent: Jan. 2, 2024

(54) SYSTEMS FOR LEARNING AND USING ONE OR MORE SUB-POPULATION FEATURES ASSOCIATED WITH INDIVIDUALS OF ONE OR MORE SUB-POPULATIONS OF A GROSS POPULATION AND RELATED METHODS THEREFOR

(71) Applicant: Walmart Apollo, LLC, Bentonville, AR (US)

(72) Inventors: Abhimanyu Mitra, San Jose, CA (US); Kannan Achan, Saratoga, CA (US); Sushant Kumar, Sunnyvale, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 430 days.

(21) Appl. No.: 16/989,839

(22) Filed: Aug. 10, 2020

(65) Prior Publication Data
US 2020/0372036 A1   Nov. 26, 2020

Related U.S. Application Data

(63) Continuation of application No. 16/107,914, filed on Aug. 21, 2018, now Pat. No. 10,740,340.

(Continued)

(51) Int. Cl.
*G06F 16/2457* (2019.01)
*G06N 20/00* (2019.01)
(Continued)

(52) U.S. Cl.
CPC ...... *G06F 16/24578* (2019.01); *G06F 16/248* (2019.01); *G06F 16/285* (2019.01); *G06F 16/9536* (2019.01); *G06N 20/00* (2019.01)

(58) Field of Classification Search
CPC ............. G06F 16/24578; G06F 16/285; G06F 16/9536; G06F 16/248
See application file for complete search history.

(56) References Cited

U.S. PATENT DOCUMENTS 9,898,772 B1   2/2018   Word
2006/0149640 A1   7/2006   Gordon et al.
(Continued)

*Primary Examiner* — Jay A Morrison
(74) *Attorney, Agent, or Firm* — BRYAN CAVE LEIGHTON PAISNER LLP

(57) ABSTRACT

A system including one or more processors and one or more non-transitory media storing computer instructions configured to run on the one or more processors and perform: identifying a first sub-population of case individuals from a gross population of the case individuals; presenting first test content to a first test sub-population of the case individuals, the first test content is selected according to a first statistical model; measuring a first test sub-population average feedback metric based on first test content feedback provided from the first test sub-population of the case individuals; determining that the first test sub-population average feedback metric exceeds a first control population average feedback metric of a first control population of the case individuals; and determining that a probability value for a difference between the first test sub-population average feedback metric and the first control population average feedback metric is less than a predetermined significance level value. Other embodiments are disclosed.

20 Claims, 8 Drawing Sheets

Related U.S. Application Data

(60) Provisional application No. 62/548,287, filed on Aug. 21, 2017.

(51) Int. Cl.
*G06F 16/248* (2019.01)
*G06F 16/28* (2019.01)
*G06F 16/9536* (2019.01)

(56) References Cited

U.S. PATENT DOCUMENTS

| | | |
|---|---|---|
| 2008/0195609 A1* | 8/2008 | Paris .................. H04L 43/00 |
| 2014/0122229 A1 | 5/2014 | Clark et al. |
| 2014/0330670 A1 | 11/2014 | Ainsworth et al. |
| 2016/0253689 A1 | 9/2016 | Milton et al. |

* cited by examiner

Database(s) 302

Feature Database(s) 501

Identification Database(s) 502

- Identifying one or more sub-populations of case individuals from a gross population of case individuals — 701
- Receiving a request to receive or access content from an applied individual — 702
- Identifying the applied individual — 703
- Presenting a second version of the content to the applied individual instead of a first version of the content — 704

Identifying a first sub-population of case individuals from the gross population of case individuals — 801

FIG. 8

SYSTEMS FOR LEARNING AND USING ONE OR MORE SUB-POPULATION FEATURES ASSOCIATED WITH INDIVIDUALS OF ONE OR MORE SUB-POPULATIONS OF A GROSS POPULATION AND RELATED METHODS THEREFOR

CROSS-REFERENCE TO RELATED APPLICATIONS

This application is a continuation of U.S. patent application Ser. No. 16/107,914, filed Aug. 21, 2018, issuing as U.S. Pat. No. 10,740,340. This application also claims the benefit of U.S. Provisional Application No. 62/548,287, filed Aug. 21, 2017. U.S. Provisional Application No. 62/548,287, U.S. patent application Ser. No. 16/107,914, and U.S. Pat. No. 10,740,340, each of which are incorporated herein by reference in their entirety.

TECHNICAL FIELD

This disclosure relates to systems for learning and using one or more sub-population features associated with individuals of one or more sub-populations of a gross population.

BACKGROUND

Computer systems can involve recommendation systems. These recommendation systems can personalize content for use. A recommendation system can involve providing a personalized approach.

BRIEF DESCRIPTION OF THE DRAWINGS

To facilitate further description of the embodiments, the following drawings are provided in which:

FIG. 5 illustrates a representative block diagram of one or more databases of the system of FIG. 3, according to the embodiment of FIG. 3;

FIG. 7 illustrates a flow chart for an embodiment of a method;

FIG. 8 illustrates an exemplary activity of identifying one or more sub-populations of case individuals from a gross population of case individuals, according to the embodiment of FIG. 7.

Figure 1:
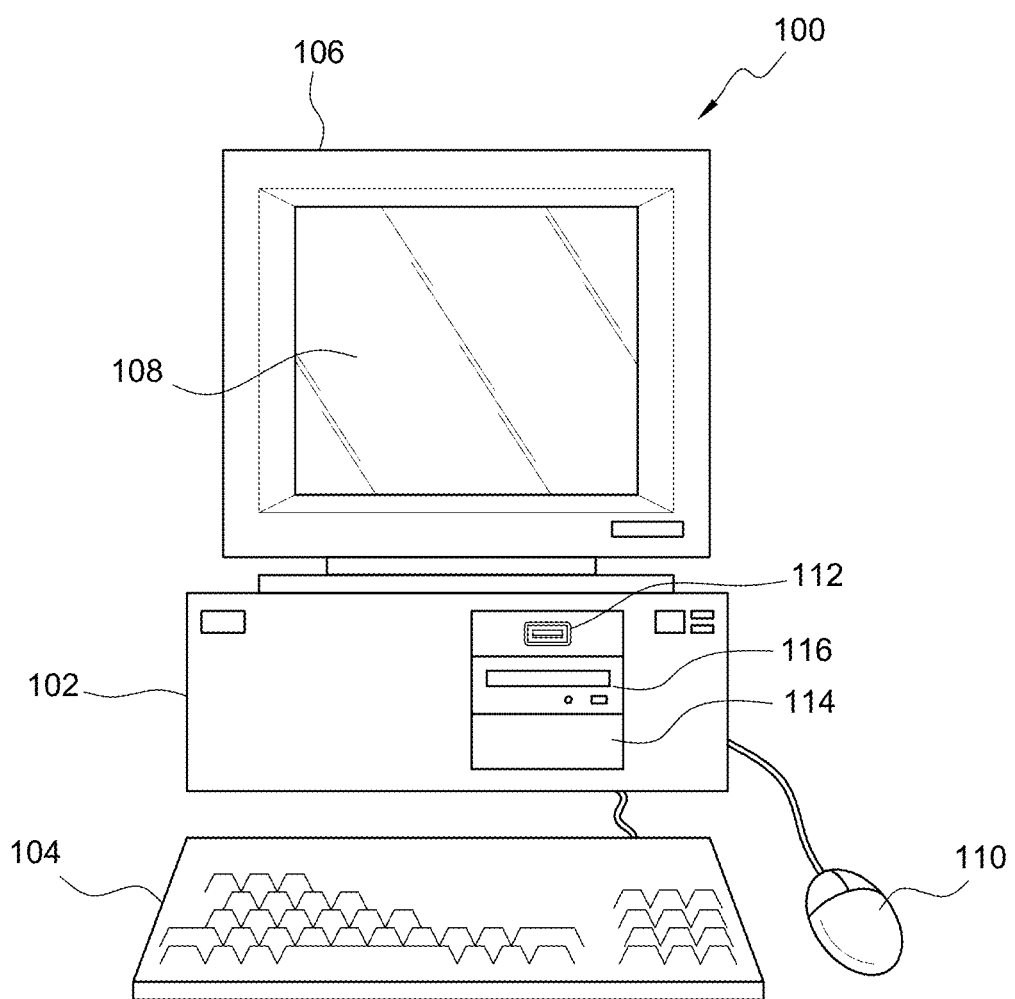
FIG. 1 illustrates a front elevational view of an exemplary computer system that is suitable to implement at least part of a central computer system, at least part of one or more contact computer systems, and/or at least part of one or more third party computer systems of the system of FIG. 3, and/or to implement at least part of one or more of the activities of the method of FIG. 7 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 100 can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also can be appropriate for implementing part or all of one or more embodiments of the techniques, methods, and/or systems described herein.

In many embodiments, computer system 100 can comprise chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

Figure 2:
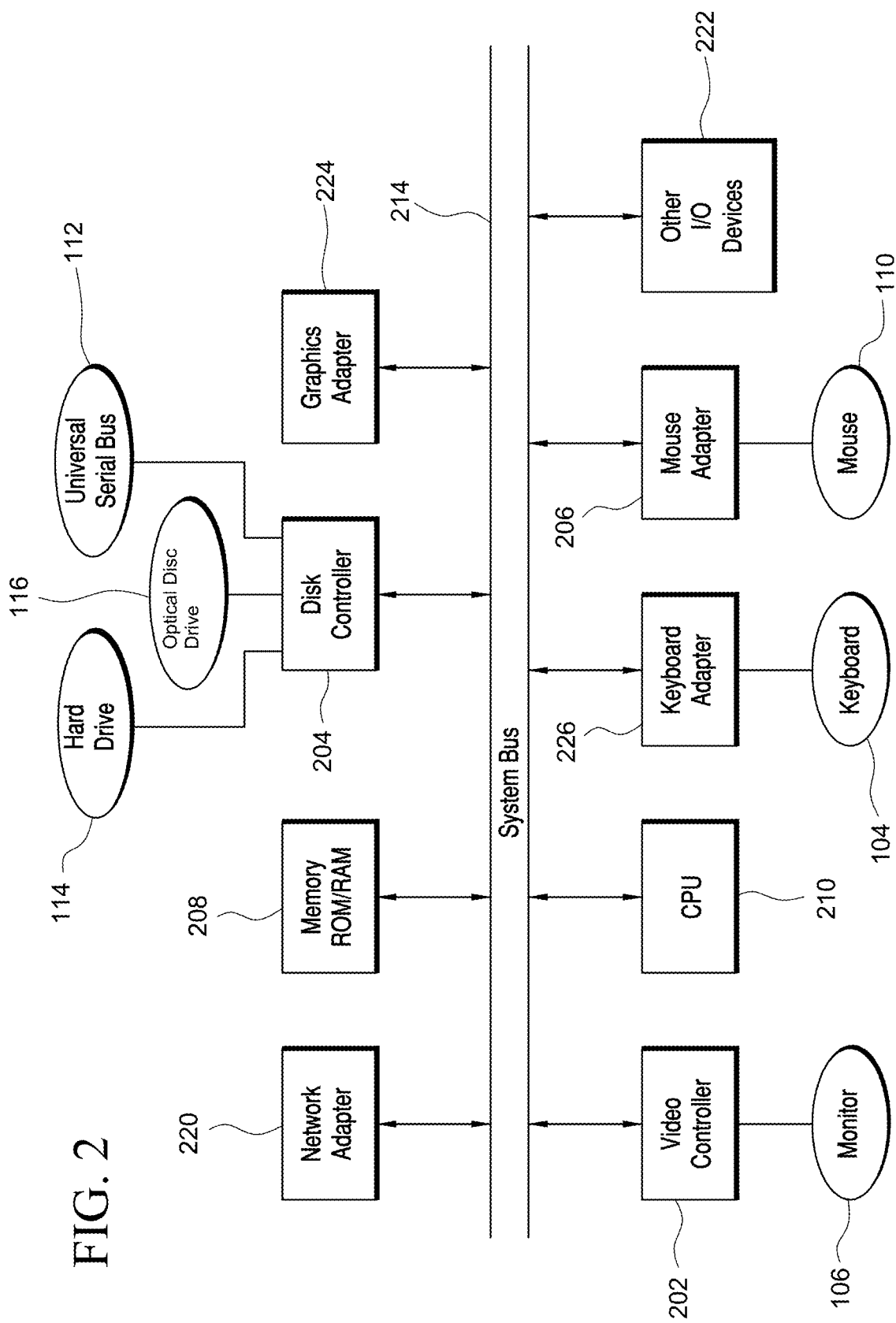
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In many embodiments, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), optical disc drive 116 (FIGS. 1 & 2), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Washington, United States of America, (ii) Mac® OS by Apple Inc. of Cupertino, California, United States of America, (iii) UNIX® OS, and (iv) Linux® OS. Further exemplary operating systems can comprise (i) iOS™ by Apple Inc. of Cupertino, California, United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Washington, United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a mobile device. In certain additional embodiments, computer system 100 may comprise an embedded system.

As used herein, the term "mobile device" can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable computer device, or another portable computer device with the capability to present audio and/or visual data (e.g., text, images, videos, music, etc.).

In many examples, a mobile device can comprise a volume and/or weight sufficiently small as to permit the mobile device to be easily conveyable by hand. For example, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4016 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia®, Surface Pro™, or similar product by the Microsoft Corporation of Redmond, Washington, United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) iOS™ by Apple Inc. of Cupertino, California, United States of America, (ii) Blackberry® OS by Research In Motion (RIM) of Waterloo, Ontario, Canada, (iii) Android™ OS developed by the Open Handset Alliance, or (iv) Windows Mobile™ OS by Microsoft Corp. of Redmond, Washington, United States of America.

Figure 3:
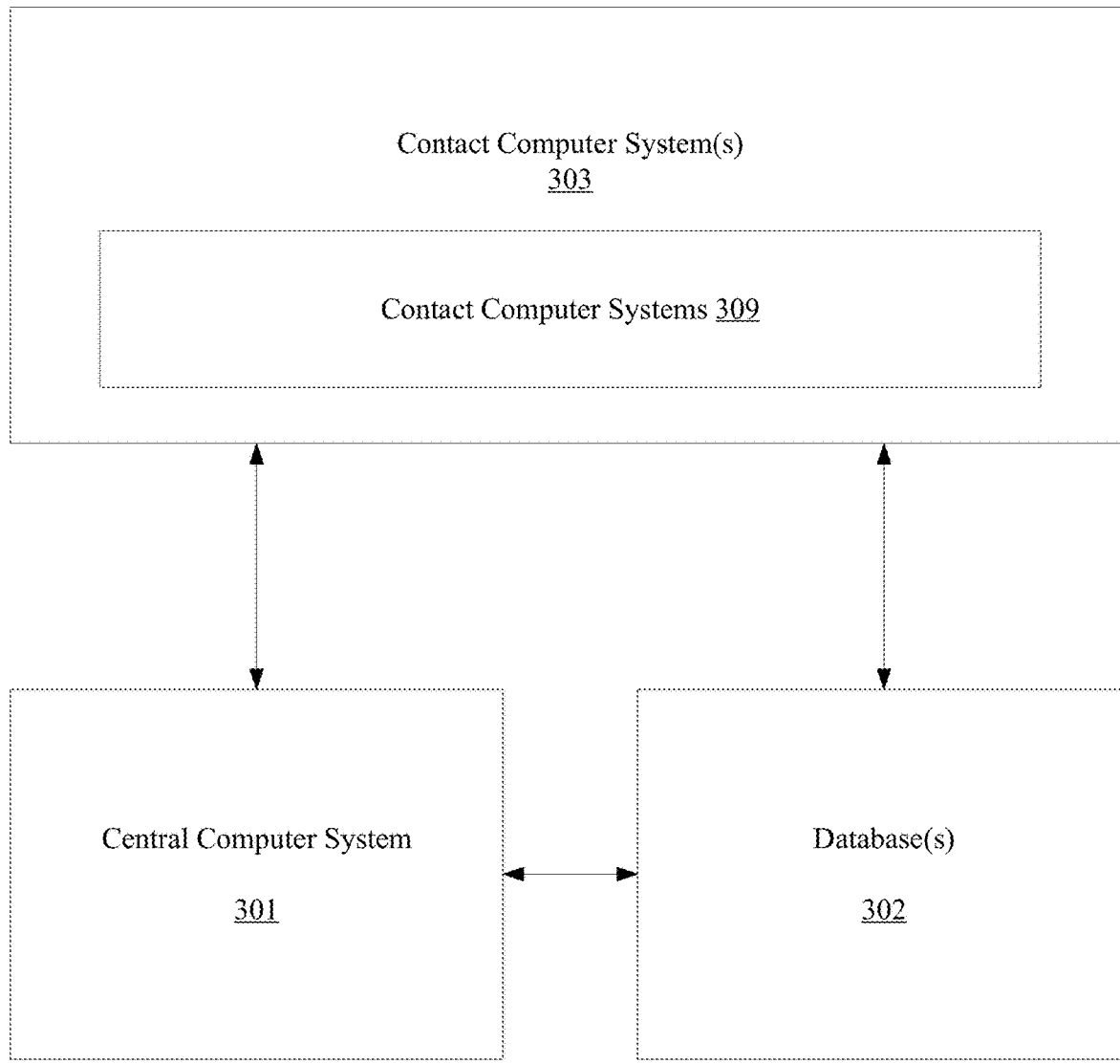
FIG. 3 illustrates a representative block diagram of a system, according to an embodiment.

Skipping ahead now in the drawings, FIG. 3 illustrates a representative block diagram of a system 300, according to an embodiment. In many embodiments, system 300 can comprise a computer system. In some embodiments, system 300 can be implemented to perform part or all of one or more methods (e.g., method 700 (FIG. 7)).

System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 is operable to identify from a gross population of case individuals one or more sub-populations of the case individuals for which (i) the case individuals of the sub-population(s) are associated with one or more sub-population features corresponding to the particular sub-population(s), and (ii) when provided with content selected according to an incumbent statistical model and one or more alternative statistical models, an average feedback of the case individuals of the sub-population(s) to content selected according to at least one of the alternative statistical model(s) exceeds an average feedback of the case individuals of the sub-population(s) to content selected according to the incumbent statistical model and a difference in the average feedback of the case individuals of the sub-population(s) to content selected according to the at least one of the alternative statistical model(s) and the average feedback of the case individuals of the sub-population(s) to content selected according to the incumbent statistical model is statistically significant. For example, the incumbent statistical model can involve a level of significance l, where l is a configurable parameter in the model. Further, for each of the sub-population(s) identified from the gross population, system 300 can associate the sub-population feature(s) that correspond to a particular sub-population with the alternative statistical model that results in the most statistically significant difference in average feedback for that particular sub-population. As a result, system 300 advantageously can learn one or more sets of sub-population feature(s) from which a content provider, which may be the operator of system 300 or another party, can determine whether or not to select content to provide to one or more applied individuals according to the incumbent statistical model or one or more of the alternative statistical model(s). In some embodiments, system 300 can confirm for applied individuals, whether or not a particular applied individual is associated with a set of the sub-population feature(s) learned by system 300, and can select content to provide to the applied individual according to the incumbent statistical model or one of the alternative statistical model(s) based on whether or not the applied individual is associated with a set of the sub-population feature(s) learned by system 300.

Further, as used herein, the term "individual" can refer to a person or a person performing an action, and the term "individuals" can refer to people or people performing a same action. The action can be any suitable action, such as, for example, visiting a type of website, selecting a type of content filter, purchasing a type of item, etc.

Meanwhile, the terms "case" and "applied," when used herein to modify the terms "individual" or "individuals," are used for purposes of clarifying how content is being provided to the individual or individuals, with "case" being used for an individual or individuals while system 300 is identifying the sub-population(s), and with "applied" being used for an individual or individuals when system 300 has identified the sub-population(s) and is presenting content in view of the sub-population feature(s) of the sub-population(s). The terms "case" and "applied" should not otherwise be construed as limiting of the terms "individual" or "individuals."

In many embodiments, implementing system 300 can permit personalization of content provided to applied individual(s) to be limited to instances where personalization of content will result in a statistically significant difference in engagement with the content. Limiting personalization of content when providing content to applied individual(s) to instances where personalization will result in a statistically significant difference in engagement with the content may be advantageous, such as, for example, where a content provider prefers to otherwise provide specific content to other applied individual(s) and/or where a content provider wants to continue refining the sub-populations with respect to other applied individual(s), in which case the other applied individual(s) can be treated as case individual(s). Further, limiting personalization of content when providing content to applied individual(s) to instances where personalization will result in a statistically significant difference in engagement with the content may be advantageous to free up computational resources of system 300 for other purposes, such as, for example, further refining the sub-populations. In many embodiments, the different content with which system 300 is implemented can comprise different versions of a website, and implementing system 300 can help to improve engagement with the website.

In many embodiments, implementing system 300 can be advantageous to allow a content provider to personalize content in an unconventional manner. For example, rather than relying on subjectively identified sub-population(s) of a gross population of individuals to target with personalized content, implementing system 300 can permit a content provider to identify sub-populations of the gross population of individuals to target with personalized content based on statistical significance. Meanwhile, system 300 can use objective rules (e.g., a probability value, etc.) to identify relevant sub-populations of the gross population of individuals. Moreover, system 300 can be helpful to make content personalization more effective by increasing a likelihood of engagement by content consumers.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage devices) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs, and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central computer system 301 is configured to communicate with contact computer systems 303 of multiple individuals (e.g., multiple case individuals and/or one or more applied individuals). For example, the individual(s) can interface (e.g., interact) with central computer system 301, and vice versa, via contact computer systems 303.

In these or other embodiments, contact computer systems 303 can comprise contact computer system 309. In some embodiments, system 300 can comprise one or more of contact computer systems 303.

In many embodiments, central computer system 301 can refer to a back end of system 300 operated by an operator and/or administrator of system 300. In these or other embodiments, the operator and/or administrator of system 300 can manage central computer system 301, the processor(s) of central computer system 301, and/or the memory storage device(s) of central computer system 301 using the input device(s) and/or output device(s) of central computer system 301.

Like central computer system 301, contact computer systems 303 each can be similar or identical to computer system 100 (FIG. 1), and in many embodiments, multiple or all of contact computer systems 303 can be similar or identical to each other. In many embodiments, contact computer systems 303 can comprise one or more desktop computer devices and/or one or more mobile devices, etc. At least part of central computer system 301 can be located remotely from contact computer systems 303.

Meanwhile, in many embodiments, for reasons explained later herein, central computer system 301 also can be configured to communicate with one or more databases 302 (e.g., one or more feature databases 501 (FIG. 5), one or more identification databases 502 (FIG. 5), etc.). Database(s) 302 can be stored on one or more memory storage devices (e.g., non-transitory memory storage device(s)), which can be similar or identical to the one or more memory storage device(s) (e.g., non-transitory memory storage device(s)) described above with respect to computer system 100 (FIG. 1). Also, in some embodiments, for any particular database of database(s) 302, that particular database can be stored on a single memory storage device of the memory storage device(s) and/or the non-transitory memory storage device(s) storing database(s) 302 or it can be spread across multiple of the memory storage device(s) and/or non-transitory memory storage device(s) storing database(s) 302, depending on the size of the particular database and/or the storage capacity of the memory storage device(s) and/or non-transitory memory storage device(s).

In these or other embodiments, the memory storage device(s) of central computer system 301 can comprise some or all of the memory storage device(s) storing database(s) 302. In further embodiments, some of the memory storage device(s) storing database(s) 302 can be part of one or more of contact computer systems 303 and/or one or more third-party computer systems (i.e., other than central computer system 301 and/or contact computer systems 303), and in still further embodiments, all of the memory storage device(s) storing database(s) 302 can be part of one or more of contact computer systems 303 and/or one or more of the third-party computer system(s). Like central computer system 301 and/or contact computer systems 303, when applicable, each of the third-party computer system(s) can be similar or identical to computer system 100 (FIG. 1). Notably, the third-party computer systems are not shown at FIG. 3 in order to avoid unduly cluttering the illustration of FIG. 3, and database(s) 302 are illustrated at FIG. 3 apart from central computer system 301 and contact computer systems 303 to better illustrate that database(s) 302 can be stored at memory storage device(s) of central computer system 301, contact computer systems 303, and/or the third-party computer system(s), depending on the manner in which system 300 is implemented.

Database(s) 302 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, contact computer systems 303, the third-party computer system(s), and/or database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
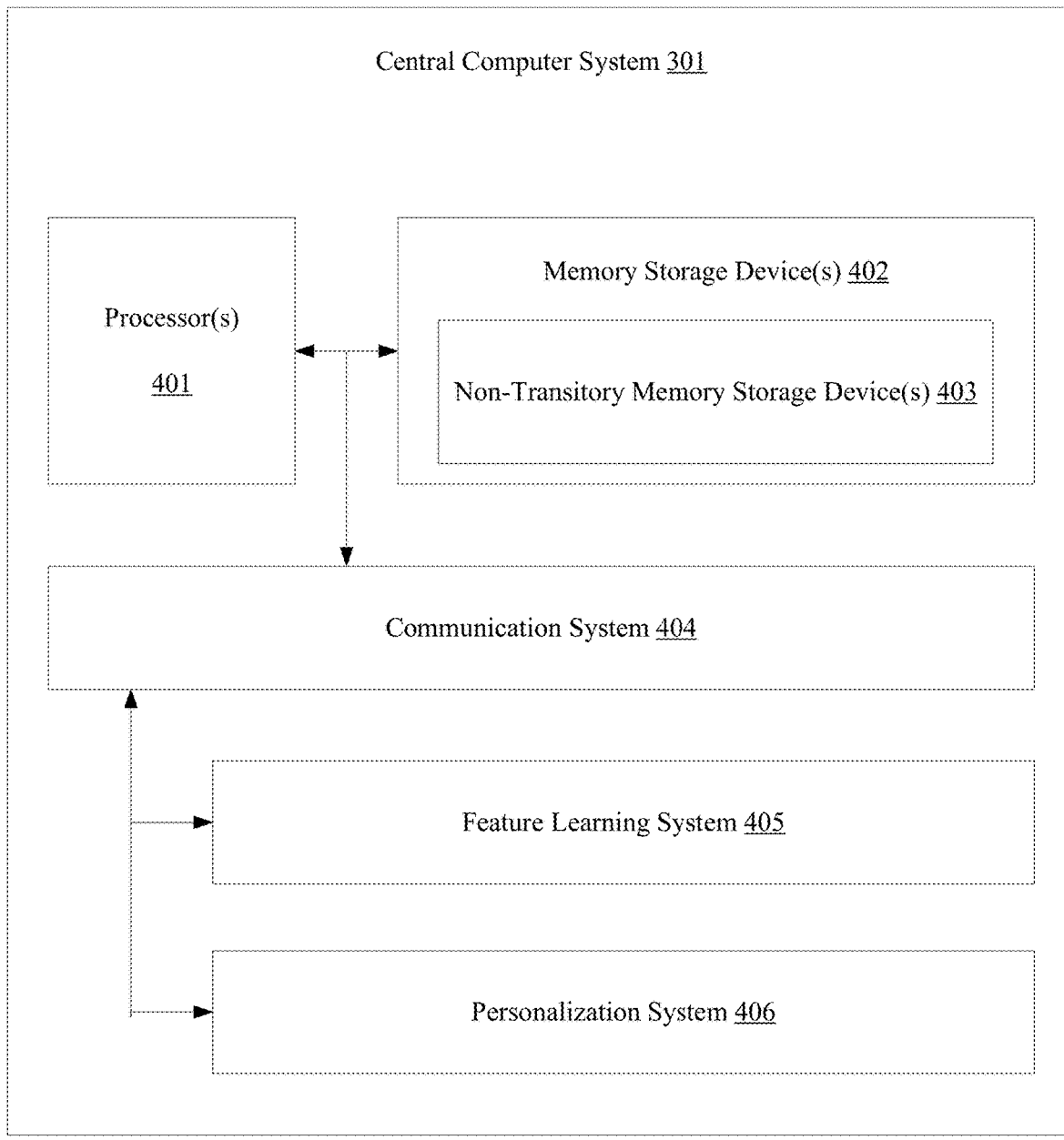
FIG. 4 illustrates a representative block diagram of a central computer system of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 302, according to the embodiment of FIG. 3.

Referring to FIG. 4, in many embodiments, central computer system 301 can comprise one or more processors 401 and one or more memory storage devices 402. Further, memory storage device(s) 402 can comprise one or more non-transitory memory storage devices 403.

Meanwhile, in these or other embodiments, central computer system 301 comprises a communication system 404, a feature learning system 405, and a personalization system 406. In these or other embodiments, part or all of at least one or more of communication system 404, feature learning system 405, and personalization system 406 can be part of at least one or more others of communication system 404, feature learning system 405, and personalization system 406, and vice versa. In these or other embodiments, at least one or more of communication system 404, feature learning system 405, and personalization system 406 can be separate server systems apart and independent from the central computer system 301. In these or other embodiments, communication system 404, feature learning system 405, and/or personalization system 406 can be located spatially apart from each other, and/or located separately from central computer system 301. In these or other embodiments, communication system 404 can communicate with feature learning system 405 and/or can communicate with personalization system 406, and/or vice versa. Similarly, feature learning system 405 can communicate with personalization system 406, and/or vice versa. In these or other embodiments, communication system 404, feature learning system 405, and/or personalization system 406 can communicate with central computer system 301, and/or vice versa.

In many embodiments, processor(s) 401 can be similar or identical to the processor(s) described above with respect to computer system 100 (FIG. 1) and/or central computer system 301 (FIG. 3); memory storage device(s) 402 can be similar or identical to the memory storage device(s) described above with respect to computer system 100 (FIG. 1) and/or central computer system 301 (FIG. 3); and/or non-transitory memory storage device(s) 403 can be similar or identical to the non-transitory memory storage device(s) described above with respect to computer system 100 (FIG. 1) and/or central computer system 301 (FIG. 3). Further, communication system 404, feature learning system 405, and personalization system 406 can be implemented with hardware and/or software, as desirable. Although communication system 404, feature learning system 405, and personalization system 406 are shown at FIG. 4 as being separate from processor(s) 401, memory storage device(s) 402, and/or non-transitory memory storage device(s) 403, in many embodiments, part or all of communication system 404, feature learning system 405, and personalization system 406 can be stored at memory storage device(s) 402 and/or non-transitory memory storage device(s) 403 and can be called and run at processor(s) 401, such as, for example, when the part or all of communication system 404, feature learning system 405, and personalization system 406 are implemented as software.

Communication System 404

Communication system 404 can provide and manage communication between the various elements of central computer system 301 (e.g., processor(s) 401, memory storage device(s) 402, non-transitory memory storage device(s) 403, communication system 404, feature learning system 405, and personalization system 406, etc.) and manage incoming and outgoing communications between central computer system 301 (FIG. 3) and contact computer systems 303 (FIG. 3), the third party computer system(s), and/or database(s) 302 (FIG. 3). Like the communications between central computer system 301 (FIG. 3), contact computer systems 303 (FIG. 3), the third party computer system(s), and/or database(s) 302 (FIG. 3), communication system 404 can be implemented using any suitable manner of wired and/or wireless communication, and/or using any one or any combination of wired and/or wireless communication network topologies and/or protocols, as described above with respect to the central computer system 301 (FIG. 3), contact computer systems 303 (FIG. 3), the third party computer system(s), and/or database(s) 302 (FIG. 3). In many embodiments, communication system 404 can be part of hardware and/or software implemented for communications between central computer system 301 (FIG. 3), contact computer systems 303 (FIG. 3), the third party computer system(s), and/or database(s) 302 (FIG. 3). For example, as applicable, communication system 404 can permit processor(s) 401 to call (i) software (e.g., at least part of feature learning system 405, personalization system 406, etc.) stored at memory storage device(s) 402 and/or non-transitory memory storage device(s) 403, and/or (ii) data stored at memory storage device(s) 402, at non-transitory memory storage device(s) 403, and/or in database(s) 302 (FIG. 3).

Feature Learning System 405

Feature learning system 405 can identify from a gross population of case individuals one or more sub-populations of the case individuals. The case individuals of the sub-population(s) can be associated with one or more sub-population features corresponding to the particular sub-population(s). Further, when provided with content selected according to an incumbent statistical model and one or more alternative statistical models, an average feedback of the case individuals of the sub-population(s) to content selected according to at least one of the alternative statistical model(s) exceeds an average feedback of the case individuals of the sub-population(s) to content selected according to the incumbent statistical model and a difference in the average feedback of the case individuals of the sub-population(s) to content selected according to the at least one of the alternative statistical model(s) and the average feedback of the case individuals of the sub-population(s) to content selected according to the incumbent statistical model can be statistically significant. For example, the incumbent statistical model can involve a level of significance l, where l is a configurable parameter of the system.

In many embodiments, the feature learning system can identify a customized (e.g., optimal) arrangement for a given instance based on its context. A feature learning system could be leveraged to target users for future applications as well as personalize the choice of optimal systems for content.

In some embodiments, the techniques described herein can provide several technological improvements to feature learning approaches. For example, the techniques described herein can reduce the network load on the system. In particular, users can run fewer search queries when the users are presented with more responsive relevant content, which can beneficially reduce the amount of computing resources required to service the search queries, and/or can advantageously mitigate problems with available bandwidth, reduce network traffic, and/or improve management of cache memory.

In many embodiments, the case individuals of the gross population of case individuals can access or receive the content provided by feature learning system 405 at one or more of contact computer system(s) 303 (FIG. 3) via communication system 404. In these or other embodiments, feature learning system 405 can receive feedback to the content provided by the case individuals from the one or more of contact computer system(s) 303 via communication system 404.

In many embodiments, in order to identify the one or more sub-populations of case individuals from the gross population of case individuals, feature learning system 405 can identify a control sub-population of case individuals of the gross population associated with a set of one or more sub-population features and a test sub-population of case individuals of the gross population associated with the set of sub-population features. Applying an AB testing methodology to the control sub-population and the test sub-population, feature learning system 405 can present content selected according to an incumbent statistical model (i.e., control content) to case individuals of the control sub-population and content selected according to an alternative or different statistical model (i.e., test content) to case individuals of the test sub-population. Meanwhile, feature learning system 405 can measure an average feedback metric of the case individuals of the control group provided in response to the control content and an average feedback metric of the case individuals of the test group provided in response to the test content to determine whether the average feedback metric of the case individuals of the test group exceeds the average feedback metric of the case individuals of the control group and whether a difference in the average feedback metrics is statistically significant.

In many embodiments, the difference in the average feedback metrics can be statistically significant when a probability value of the difference in the average feedback metrics is less than a predetermined significance level value. Meanwhile, the probability value can refer to a probability that the difference in the average feedback metrics is caused by random chance. If the difference in the average feedback metrics is statistically significant (e.g., the probability value of the difference in the average feedback metrics is less than the predetermined significance level value. Under the null hypothesis that the difference is average feedback metrics is purely due to random chance, the probability that the difference in the average feedback metrics is larger in absolute value than the observed difference in average user feedback, is less than the predetermined significance level value 1, a configurable parameter in the system), feature learning system 405 can recognize the case individuals of the control sub-population and the test sub-population together as forming one of the sub-populations of case individuals identified from the gross population of case individuals. Meanwhile, the probability value can refer to a probability that the difference in the average feedback metrics is caused by random chance. Further, feature learning system 405 can perform this methodology with one or more other pairs of control and test sub-populations of the case individuals of the gross population that are associated with one or more other sets of sub-population features, and in many embodiments, can do so for all sets of sub-population features associated with the case individuals of the gross population, recognizing the case individuals of the pairs of control and test sub-populations for which the average feedback metrics of the test sub-populations exceed the average feedback metrics of the control sub-populations and for which the differences in the average feedback metrics are statistically significant, if any, as other sub-populations of case individuals identified from the gross population of case individuals. Meanwhile, sub-populations of case individuals of pairs of control and test sub-populations of the case individuals of the gross population for which the average feedback metric of the test sub-population does not exceed the average feedback metric of the control sub-population and/or for which the differences in the average feedback metrics are not statistically significant (e.g., that result in differences in average feedback metrics for which the probability value of the differences in the average feedback metrics is greater than or equal to the predetermined significance level value. Under the null hypothesis that the difference is average feedback metrics is purely due to random chance, the probability that the difference in the average feedback metrics is larger than the observed difference in average user feedback, is less than the predetermined significance level value 1), if any, can be excluded by feature learning system 405 from the sub-population(s) of case individuals identified from the gross population of case individuals.

In some embodiments, feature learning system 405 can provide several technological improvements. The approach described herein is different from conventional approaches, which applied subjective human manual determinations to determine the personalization method that would work better for certain sets of users and resulted in setting up elaborate A/B test designs to test a random number of subjective human guesses. By contrast, this data driven approach advantageously removes the subjective element of human guesses and instead uses computer rules. The approach can derive personalization methods that matches certain sets of users using a single A/B test set-up.

In some embodiments, content presented by feature learning system 405 to the case individuals of a pair of a control sub-population and a test sub-population can comprise any suitable form of content for which the case individuals can provide a feedback metric. For example, in many embodiments, content presented by feature learning system 405 to the case individuals of a control sub-population and a test sub-population can comprise different versions of a website. For example, content presented to the case individuals of a control sub-population can comprise a version of a website selected according to an incumbent statistical model. Meanwhile, content presented to the case individuals of a test sub-population can comprise a version of the website selected according to an alternative statistical model.

In some embodiments, the feedback metric measured by feature learning system 405 can comprise any suitable metric by which feedback of case individuals of a pair of a control sub-population and a test sub-population of the case individuals of the gross population can be measured. For example, in many embodiments, the feedback metric can comprise a click-through-rate, an order per session, or a revenue per session, such as, for example, when content presented by feature learning system 405 to the case individuals of a control sub-population and a test sub-population comprises different versions of a website.

In some embodiments, the predetermined significance level value against which feature learning system 405 compares the probability value of the difference in feedback metrics provided by case individuals of a pair of a control sub-population and a test sub-population of the case individuals of the gross population can comprise any suitable value below which the difference in average feedback metrics provided by case individuals of the control sub-population and the test sub-population is unlikely to have been caused by random chance. For example, in many embodiments, the predetermined significance level value can be 0.01 (1 percent) or 0.05 (5 percent).

In some embodiments, feature learning system 405 can evaluate any suitable sub-population feature or sub-population features that can be associated with a case individual of the gross population when feature learning system 405 is identifying the one or more sub-populations of case individuals from the gross population of case individuals. In many embodiments, the sub-population feature(s) associated with the respective case individuals of the gross population of case individuals can be stored in feature database 501 (FIG. 5), and feature learning system 405 can query feature database 501 (FIG. 5) to determine relevant case individuals of the gross population of case individuals when identifying the case individuals of the pair(s) of control and test sub-populations from the gross population of case individuals.

For example, in many embodiments, the sub-population feature(s) can comprise a gender of the case individual and/or an age of the case individual. In these or other embodiments, the sub-population feature(s) can comprise one or more browsing acts of the case individual and/or a purchase history of the case individual, such as, for example, when content presented by feature learning system 405 to the case individuals of the gross population comprises different versions of a website. Exemplary browsing acts can comprise conducting a search, applying a filter, changing a view, selecting a link, etc.

In many embodiments, feature learning system 405 can limit the sub-population feature(s) evaluated to a finite number of real values. For example, when evaluating age as a sub-population feature, feature learning system 405 can define age by individual years or by ranges of years (e.g., ages 11-20, ages 21-30, etc.). Limiting the sub-population feature(s) evaluated by feature learning system 405 to a finite number of real values can reduce computational demands on feature learning system 405. In some embodiments, the number of real values to which the sub-population feature(s) evaluated by feature learning system 405 is limited can depend on the computational capacity of processor(s) 401.

In many embodiments, in order to identify a control sub-population and a test sub-population from the case individuals of the gross population, feature learning system 405 can randomly select a first group of the case individuals of the gross population that are associated with a set of sub-population feature(s) to form the control sub-population and a second group of the case individuals of the gross population that are associated with the set of sub-population feature(s) to form the test sub-population. The first group of the case individual of the gross population can be exclusive of the second group of the case individuals of the sub-population. Feature learning system 405 can perform this methodology for each of the pairs of control and test sub-populations evaluated by feature learning system 405. In some embodiments, case individuals of different pairs of control and test sub-populations can overlap, and in other embodiments, case individuals of different pairs of control and test sub-populations can be exclusive of each other. By randomly selecting the case individuals of which the control sub-populations and the test sub-populations are comprised, feature learning system 405 can beneficially identify the one or more sub-populations of case individuals from the gross population of case individuals with less or without sampling bias.

In some embodiments, sub-populations of case individuals of pairs of control and test sub-populations of the case individuals of the gross population having quantities of case individuals falling below a sub-population case individual quantity threshold value also can be excluded by feature learning system 405 from the sub-populations of case individuals identified from the gross population of case individuals. For example, in some embodiments, the sub-population case individual quantity threshold value can be approximately 500 or 1000 case individuals. In some embodiments, permitting case individuals of different pairs of control and test sub-populations to overlap can permit quantities of case individuals of pairs of control and test sub-populations of the case individuals of the gross population to be greater, which may permit feature learning system 405 to identify the sub-population(s) of case individuals from the gross population of case individuals with greater accuracy. In many embodiments, the sub-population case individual quantity threshold value can be determined by an operator of system 300 (FIG. 3).

In some embodiments, sub-populations of case individuals of pairs of control and test sub-populations of the case individuals of the gross population for which an average feedback metric for the test sub-population of case individuals does not exceed an average feedback metric for the control sub-population by an average feedback metric variance threshold value also can be excluded by feature learning system 405 from the sub-populations of case individuals identified from the gross population of case individuals. In many embodiments, the average feedback metric variance threshold value can be determined by an operator of system 300 (FIG. 3).

In some embodiments, feature learning system 405 can limit the sub-population(s) of case individuals identified from the gross population of case individuals to a predetermined number of sub-populations. In many embodiments, feature learning system 405 can limit the sub-population(s) of case individuals identified from the gross population of case individuals to a predetermined number of sub-population(s) having a greatest statistical significance (e.g., having probability values below the predetermined significance level value by one or more greatest margins) and/or having one or more greatest quantities of case individuals. In some embodiments, limiting the sub-population(s) of case individuals identified from the gross population of case individuals to a predetermined number of sub-population(s) can reduce computational demands on feature learning system 405. In some embodiments, the predetermined number of sub-population features to which feature learning system 405 limits the sub-population(s) of case individuals identified from the gross population of case individuals can depend on the computational capacity of processor(s) 401.

In some embodiments, the statistical models based upon which feature learning system 405 selects content to present to a control sub-population and a test sub-population of the case individuals of the gross population can comprise any suitable different statistical models. Exemplary statistical models can comprise a linear regression, a logistic regression, a Poisson regression, a hierarchical tree-based regression, etc.

In some embodiments, when feature learning system 405 is identifying the sub-population(s) of case individuals from the gross population of case individuals, feature learning system 405 can evaluate differences in the average feedback metrics for statistical significance for test content selected according to multiple alternative statistical models. In these embodiments, the incumbent statistical model based upon which the control content is selected can remain the same.

Evaluating differences in the average feedback metrics for statistical significance for test content selected according to multiple alternative statistical models can be advantageous where two or more sets of sub-population feature(s) evaluated by feature learning system 405 return statistically significant differences in average feedback metrics for different and/or multiple alternative statistical models. For example, the statistical models can have a level of significance l, where l is a configurable parameter in the model. For example, one set of sub-population feature(s) comprising at least one first sub-population feature may return a statistically significant difference in average feedback metrics for a first alternative statistical model while another set of sub-population feature(s) comprising at least one of the first sub-population feature(s) and at least one other sub-population feature may return a statistically significant difference in average feedback metrics for a different alternative statistical model even though the other set of sub-population feature(s) includes at least one of the first sub-population feature(s).

In some embodiments, when feature learning system 405 is identifying the sub-population(s) of case individuals from the gross population of case individuals, and when feature learning system 405 evaluates differences in the average feedback metrics for statistical significance for test content selected according to multiple alternative statistical models, feature learning system 405 can evaluate differences in the average feedback metrics for statistical significance for test content selected according to multiple alternative statistical models for each set of sub-population feature(s) evaluated by feature learning system 405. In other embodiments, when feature learning system 405 is identifying the sub-population(s) of case individuals from the gross population of case individuals, and when feature learning system 405 evaluates differences in the average feedback metrics for statistical significance for test content selected according to multiple alternative statistical models, feature learning system 405 can evaluate differences in the average feedback metrics for statistical significance for test content selected according to multiple alternative statistical models only for sets of sub-population feature(s) evaluated by feature learning system 405 for which at least one difference in the average feedback metrics is statistically significant. For example, in these embodiments, feature learning system 405 can compare a difference in the average feedback metrics for statistical significance for test content selected according to a first alternative statistical model for each set of sub-population feature(s) evaluated by feature learning system 405. Then, feature learning system 405 can compare a difference in the average feedback metrics for statistical significance for test content selected according to another alternative statistical model for the sub-population feature(s) that are determined to be statistically significant relative to the first alternative statistical model. In some of these embodiments, feature learning system 405 can continue this process for more alternative statistical models, limiting the sets of sub-population feature(s) evaluated as applicable, until a next statistical model no longer returns a statistically significant difference in the average feedback metrics for the sub-population feature(s) being evaluated.

In some embodiments, when feature learning system 405 is identifying the sub-population(s) of case individuals from the gross population of case individuals, and when feature learning system 405 evaluates differences in the average feedback metrics for statistical significance for test content selected according to multiple alternative statistical models, feature learning system 405 can reuse the same control sub-population and test sub-population for each set of sub-population feature(s) evaluated by feature learning system 405. However, in other embodiments, feature learning system 405 can identify a new control sub-population and a new test sub-population for each alternative statistical model used to select test content.

In many embodiments, in order to identify the sub-population(s) of case individuals from the gross population of case individuals, as described above, feature learning system 405 can use an optimization algorithm.

When implementing the optimization algorithm, feature learning system 405 can assume each sub-population feature can only take a finite number of real values. For sub-population features not directly satisfying this assumption, feature learning system 405 can merge values or discretize to satisfy this assumption.

Feature learning system 405 can let $x_i=(x_{i,1}, x_{i,2}, \ldots, x_{i,F})$ be the i-th case individual and $x_{i,j}$ be the value of the j-th sub-population feature of the i-th case individual. Further, feature learning system 405 can assume the total number of sub-population features used to represent a case individual for the gross population of case individuals is F and each case individual assumes a value for each of the sub-population features, that is, a real value of $x_{i,j}$ is available for each case individual i and each sub-population feature j. Further, feature learning system 405 can let $y_i$ be the feedback metric for the i-th case individual. In some embodiments, feature learning system 405 can consider one feedback metric, making $y_i$ a scalar, and in other embodiments, feature learning system 405 can consider several feedback metrics together, making $y_i$ a vector. In some embodiments, feature learning system 405 can assume the feedback metric $y_i$ for each case individual i is mutually independent (in the probabilistic sense).

Feature learning system 405 can use T to denote a test sub-population of case individuals of a gross population of case individuals P and can use C to denote a control sub-population of case individuals of the gross population of case individuals P. Accordingly, feature learning system 405 can let $x_i^T=(x_{i,1}^T, x_{i,2}^T, \ldots, x_{i,F}^T)$ be a sub-population feature vector for the i-th case individual of the test sub-population of case individuals T and can let $x_j^C=(x_{j,1}^C, x_{j,2}^C, \ldots, x_{j,F}^C)$ be a sub-population feature vector of the j-th case individual of the control sub-population of case individuals C. Further, feature learning system 405 can let be the feedback metric for the i-th case individual of the test sub-population of case individuals T and $y_i^C$ be the feedback metric for the j-th case individual in the control sub-population of case individuals C.

Feature learning system 405 can establish a criterion for establishing whether an impact of test content on a sub-population is statistically significant. For example, membership of the case individuals from the gross population of case individuals P in a test sub-population of case individuals T or a control sub-population of case individuals C can be decided randomly independent of x. Accordingly, comparison of feedback metrics for test and control sub-populations restricted to any sub-population of case individuals based on x, say the sub-population of case individuals $\{\underline{h}(x)=\underline{v}\}$ where $\underline{h}(\bullet): \mathbb{R}^R \to \mathbb{R}^K$ is a measurable function and $\underline{v} \in \mathbb{R}^K$, can yield a proper measurement of the impact of the test content in consideration for the sub-population of case individuals, where x represents features characterizing the instances, h represents a suitable transformation of the features that could be used to define subpopulation, v is defined as one of the possible values the transformed features could take and for each possible value v the set of instances for which the transformed features (transformed by h( )) take the value v, forms a subpopulation, $\mathbb{R}$ represents the set of all real numbers, K represents the dimension of the transformed feature vectors, h represents a transformation function for the features, H represents a special case of h( ), where the transformation is linear and h(x)=H x, where x is a feature vector of an instance. In some embodiments, feature learning system 405 can use linear representations of sub-population features such that $\underline{h}(\bullet)=H\times$; where H is a K×F matrix.

In order to find sub-populations of case individuals where the average feedback metric for the test sub-population exceeds the average feedback metric for the control sub-population and a difference in the average feedback metrics for the test and control sub-population of case individuals is statistically significant, feature learning system 405 can find H and $\underline{v}$ satisfying the following Relationship (1) as follows:

$$\frac{\left\|[y^T | H \cdot x = \underline{v}] - [y^C | H \cdot x = \underline{v}]\right\|}{\sqrt{\frac{Var[y^T\underline{v} | H \cdot x = \underline{v}]}{|T \cap \{H \cdot x = \underline{v}\}|} + \frac{Var[y^C | H \cdot x = \underline{v}]}{|C \cap \{H \cdot x = \underline{v}\}|}}} > q, \qquad (1)$$

$$\Leftrightarrow \frac{|T \cap \{H \cdot x = \underline{v}\}| \times |C \cap \{H \cdot x = \underline{v}\}|}{|\{H \cdot x = \underline{v}\}|} \times$$

-continued $$\frac{([y^{-T} | H \cdot x = \underline{v}] - [y^{-C} | H \cdot x = \underline{v}])^2}{V_{ar}[y^T | H \cdot x = \underline{v}] \cdot |C \cap \{H \cdot x = \underline{v}\}| + V_{ar}[y^C | H \cdot x = \underline{v}] \cdot |T \cap \{H \cdot x = \underline{v}\}|} > q^2.$$

where $[y^{-T}|H \cdot x=\underline{v}]$ and $[y^{-C}|H \cdot x=\underline{v}]$ are the average feedback metrics from the test and control sub-populations of case individuals respectively restricted to the sub-population of case individuals $\{H \cdot x=\underline{v}\}$; $Var[y^T|H \cdot x=\underline{v}]$ and $Var[y^C|H \cdot x=\underline{v}]$ are the empirical variances of the feedback metric in the test and control sub-populations of case individuals respectively restricted to the subpopulation $\{H \cdot x=\underline{v}\}$, $q^2$ is an appropriate quantile of the distribution of the quantity on the left hand side of Relationship (1), and the function |•| equals the size of the set in its argument. Under the assumption that the test content has no impact relative to the control content, the distribution of the quantity on the left hand side of Relationship (1) could be approximated by the square of a variable following standard normal distribution.

Feature learning system 405 can call a sub-population of case individuals $\{H \cdot x=\underline{v}\}$ eligible to be included in the sub-populations identified from the gross population of case individuals if it satisfies Relationship (1). A sub-population of case individuals $\{H \cdot x=\underline{v}\}$. may not be eligible according to Relationship (1) for one of the two reasons. First, there is little or no impact of the test content in consideration, or second, there is insufficient data to conclude anything, or both. These two reasons can complement each other. For example, where a larger number of case individuals are considered, feature learning system 405 can view even tiny impacts of test content as being statistically significant, whereas if a smaller number of case individuals are considered, the impact of the test content may need to be larger in order for feature learning system 405 to be able to measure the impact of the test content in a statistically significant way. On the other hand, if an impact of test content in consideration for the sub-population of case individuals is larger, feature learning system 405 can rely on a smaller number of case individuals to measure the impact of the test content in a statistically significant way, and if an impact of test content in consideration for the sub-population of individuals is smaller, feature learning system 405 can rely on a larger number of case individuals to measure the impact of the test content in a statistically significant way. The threshold for case individual sufficiency (i.e., the sub-population case individual quantity threshold value) and the threshold for impact of the test content on the sub-population (i.e., the average feedback metric variance threshold value) can be subjectively determined for feature learning system 405 by an operator of system 300 (FIG. 3).

Because solving Relationship (1) in its full generality may be impractical, feature learning system 405 instead can use Relationship (2), which relies on making specific assumptions on the dependence of feedback metric $y_i$ and case individual $x_i$. For Relationship (2), even if the sub-population(s) of case individuals are defined in terms of linear sub-population feature representations, feature learning system 405 may not assume that the relationship between feedback metric $y_i$ and case individual $x_i$ can be expressed by a known function. Instead, feature learning system 405 can aim to identify sub-population(s) of case individuals which have many case individuals, so that when feature learning system 405 applies Relationship (1) to measure the impact of test content in consideration, even relatively smaller impacts can be measured in a statistically significant way. For example, the model can include, with a level of significance l, in which l is a configurable parameter in the model.

For example, focusing on the first term on the left hand side of Relationship (1), which is a quantification of the amount of data for a sub-population of case individuals $\{H \cdot x=\underline{v}\}$, feature learning system 405 can revise this term as $|\{H \cdot x=\underline{v}\}| \cdot w^T \cdot (1-w^T)$ where $$w^T = \frac{|T \cap \{H \cdot x = \underline{v}\}|}{|\{H \cdot x = \underline{v}\}|}$$

is the fraction of case individuals of the sub-population of case individuals in the test sub-population of case individuals relative to the case individuals of the sub-population of case individuals and where $w^T$ represents the fraction of test instances in the subpopulation defined as $\{H \cdot x=\underline{v}\}$. The revised first term on the left hand side of Relationship (1) can depend on the quantity of case individuals in the sub-population of case individuals $|\{H \cdot x=\underline{v}_h\}|$ as well as the fractions of case individuals of the test sub-population of case individuals and control sub-population of case individuals relative to the case individuals of the sub-population of case individuals, given by $w^T$ and $(1-w^T)$, respectively. Feature learning system 405 can find H so as to maximize the first term on the left hand side of Relationship (1) for all sub-population(s) of case individuals created by H, videlicet $\{H \cdot x=\underline{v}_h\}$, where H represents the linear transformation applied to the features of the instances that help us define the subpopulations, and where h=1, 2, . . . , H. Since achieving that for all sub-population(s) of case individuals created by H together might be impractical, feature learning system 405 can maximize the expected value of the first term on the left hand side of Relationship (1) over all subpopulation(s) of case individuals created by H. The expected value of the first term on the left hand side of Relationship (1) over all subpopulation(s) of case individuals created by H, where each sub-population of case individuals is weighted by its relative size, can be simplified to Relationship (2) as follows:

$$E_{\underline{v}_h}\left[\frac{|T \cap \{H \cdot x = \underline{v}\}| \times |C \cap \{H \cdot x = \underline{v}\}|}{|\{H \cdot x = \underline{v}_h\}|}\right] = \frac{1}{|\mathcal{P}|}\sum_{i \in T}\sum_{j \in C} 1_{\{H \cdot (x_i^T - x_j^C) = 0\}}, \quad (2)$$

where $1_C=1$ if C is true, and $1_C=0$ otherwise, are indicator functions indicating whether condition C is true or not and $\mathcal{P}$ is the total number of instances used in the AB test.

Feature learning system 405 can search for H which maximizes the right hand side of Relationship (2). Meanwhile, feature learning system 405 can define a matrix Z, where Z represents a matrix corresponding to feature differences of all possible pairs of two instances, where one instance belongs to the test group and one instance belongs to the control group, for which columns of the matrix Z are of the form $(x_i^T - x_j^C)$, where i∈T, and j∈C. Thus, matrix Z can have dimensions equal to F×|T|·|C|. As indicated previously, F represents the total number of sub-population features corresponding to case individuals in the gross population P, and |T| and |C| represent the quantity of case individuals in the test and control sub-populations, respectively. Feature learning system 405 can let $Z_k$ be the k-th column of matrix Z. Accordingly, feature learning system 405 can search for H using Relationship (3) as follows:

$$\max_{H,\{a_k,k=1,2,\ldots,|T|\cdot|C|\}} \sum_{k=1}^{|T|\cdot|C|} a_k \quad (3)$$

$$\text{s.t. } a_k H \cdot Z_k = \underline{0}, \forall\, k = 1, 2, \ldots |T|\cdot|C|,$$

$$a_k \in \{0, 1\}, \forall\, k = 1, 2, \ldots |T|\cdot|C|.$$

For Relationship (3), the variables $a_k$ can act like slack variables, where $a_k$ represents a variable in the optimization problem in (3) corresponding to the kth column of Z taking only two possible values, 0 and 1, in the sense that if $H \cdot Z_k \neq 0$, then $a_k$ must be 0 in order to satisfy the linear constraint in Relationship (3). If $H \cdot Z_k = 0$, the corresponding slack variable $a_k$ must assume the value 1 in order to maximize the objective function $\Sigma_{k=1}^{|T|\cdot|C|} a_k$ of Relationship (3). Therefore, if H, $\{a_k, k=1, 2, \ldots, |T|\cdot|C|\}$ is a solution of the Relationship (3), then H and $\{a_k, k=1, 2, \ldots, |T|\cdot|C|\}$ will satisfy the condition $\Sigma_{k=1}^{|T|\cdot|C|} a_k = \Sigma_{i \in T} \Sigma_{j \in C} 1_{(H \cdot (x_i^T - j^C) = 0)}$, which is equal to $|\mathcal{P}|$ times the right hand side of Relationship (2), where $\mathcal{P}$ represents the total size of the population on which the A/B test is run. Accordingly, it follows that H obtained as a solution from Relationship (3) would also maximize the left hand side of Relationship (2).

Feature learning system 405 can reduce the search space of H by eliminating some redundancies and imposing some structure on H in Relationship (3). For example, feature learning system 405 can demand the rows of H be orthonormal without changing the set of sub-population(s) we consider with the help of the following two propositions: (i) if H is not a full row rank, the set of sub-population(s) generated by H, videlicet $\{\{H \cdot x = \underline{v}_h\}, h=1, 2, \ldots, H\}$, also can be generated by a lower dimensional matrix with a lesser number of rows (Proposition 1); and (ii) if H is a full row rank, the set of sub-population(s) generated by H videlicet $\{\{H \cdot x = \underline{v}_h\}, h=1, 2, \ldots, H\}$ also can be generated by a matrix with dimensions same as H for which the rows are orthonormal (Proposition 2).

Feature learning system 405 can continue solving Relationship (3) for the next best solution. When feature learning system 405 has found a set of matrices $\{H_1, H_2, \ldots, H_n\}$ and starts searching for $H_{(n+1)}$, feature learning system 405 can impose additional restrictions on Relationship (3) to search for the next best solution, where, for the set of matrices, each $H_i$ is a different transformation applied to the features of the instances to define a new set of subpopulations. The following proposition suggests that the row space of $H_{(n+1)}$ must not be a subset of the row space of $H_1$ for i=1, 2, ..., n. Feature learning system 405 can denote the row space of $H_i$ by $\mathcal{R}(H_i)$, where $\mathcal{R}$ is defined as the row space of $H_i$, which is a vector space spanned by the rows of $H_i$ and apply the proposition that if $\mathcal{R}(H_{n+1}) \subseteq \mathcal{R}(H_i)$ for some i=1, 2, ..., n, then the set of sub-population(s) generated by $H_{n+1}$ is the same as the set of sub-population(s) generated by $H_i$ (Proposition 3).

Applying this proposition, feature learning system 405 can add the restriction that $\mathcal{R}(H_{n+1}) \subseteq \mathcal{R}(H_i)$ for $H_i$, i=1, 2, ..., n. The condition $\mathcal{R}(H_{n+1}) \subseteq \mathcal{R}(H_i)$ can be equivalent to the condition $\Sigma_{j=1}^{K} H_{(n+1),j} (I - H_i^T H_i) H_{(n=1),j}^T > 0$, where $H_{(n+1),j}$ is the j-th row of $H_{(n+1)}$. The equivalence holds since $H_i^T H_i$ is the projection matrix for $\mathcal{R}(H_i)$ and hence $(I - H_i^T H_i)$ is an idempotent matrix. So, putting everything together, having found $\{H_1 = 1, 2, \ldots, n\}$, to find the (n+1)-th H matrix $H_{(n+1)}$, feature learning system 405 can solve Relationship (4) as follows:

$$\max_{H_{(n+1)},\{a_k,k=1,2,\ldots,|T|\cdot|C|\}} \sum_{k=1}^{|T|\cdot|C|} a_k \quad (4)$$

$$\text{s.t } a_k H_{(n+1)} \cdot Z_k = \underline{0}, \forall\, k = 1, 2, \ldots |T|\cdot|C|,$$

$$H_{(n+1)} \cdot H_{(n=1)}^T = I,$$

$$\sum_{j=1}^{K} H_{(n+1),j} \cdot (I - H_i^T H_i) H_{(n=1),j}^T > D, \forall\, i = 1, 2, \ldots, n,$$

$$a_k \in \{0, 1\}, \forall\, k = 1, 2, \ldots |T|\cdot|C|$$

The parameter D>0 can be chosen as an appropriate tuning parameter, which solves Relationship (4). When searching for the first matrix $H_1$, that is n=0, the fourth set of constraints in Relationship (4) can disappear.

Each run of Relationship (4) can give feature learning system 405 a sub-population feature representation $H_{(n+1)}$ and with increasing n, the optimal value of Relationship (4) drops. Feature learning system 405 can stop solving Relationship (4) when n exceeds a preset threshold or the optimal value drops below a preset threshold.

Feature learning system 405 can start from K=1 (dimension of $H_{(n+1)}$ is K×F) and then continue increasing K, thus increasing the granularity of the sub-population(s). The required magnitude of impact of the test content in order to satisfy Relationship (1) goes up as a consequence, which in turn reduces the likelihood of Relationship (1) being satisfied for those sub-population(s). Thus, feature learning system 405 can keep the K much lower compared to F.

To solve Relationship (4), feature learning system 405 can use a Lagrangian relaxation of Relationship (4) given by Relationship (5), as follows:

$$\max_{H_{(n+1)},\{a_k \in \{0,1\},k=1,2,\ldots,|T|\cdot|C|\}} L = \sum_{k=1}^{|T|\cdot|C|} a_k + \quad (5)$$

$$\sum_{j=1}^{K} \sum_{k=1}^{|T|\cdot|C|} \lambda_{j,k} H_{(n+1),j} Z_k + \sum_{i=1}^{n} \mu_i \left( \sum_{j=1}^{K} H_{(n+1),j} (I - H_i^T H_i) H_{(n=1),j}^T - D \right),$$

$$\text{s.t. } H_{(n+1)} \cdot H_{(n=1)}^T = I$$

where $H_{(n+1),j}$ is the j-th row of $H_{(n+1)}$ and $\mu_i$ and $\lambda_{j,k}$ are penalty constants. Feature learning system 405 can take a greedy approach and solve Relationship (5) by updating $H_{(n+1)}$ and $\{a_k \in \{0,1\}, k=1, 2, \ldots, |T|\cdot|C|\}$ in sequence. Feature learning system 405 can choose $\mu_i = \frac{1}{2}$ for all i=1, 2, ..., n, and at each update, feature learning system 405 can change the constant $\lambda_{j,k}$ as $\lambda_{j,k} = -\text{sign}(H_{(n+1),j} \cdot Z_k)$, where $H_{(n+1)}$ in the last step is used for computation of the constant.

Feature learning system 405 can update $H_{(n+1)}$ by gradient descent, moving the $H_{(n+1)}$ slightly in the direction of the derivative of L given in Relationship (5) with respect to $H_{(n+1)}$. Also, leveraging Proposition 3, feature learning system 405 can consider only the update vector projected in the orthogonal space of the row space of current $H_{(n+1)}$. Accordingly, the update to the matrix $H_{(n+1)}$ can be, for a small $\epsilon > 0$, Relationship (6), as follows:

$$H_{(n=1)}^{updated} = H_{(n+1)} + \epsilon \frac{\frac{\partial L}{\partial H_{(n+1)}}(I - H_{(n+1)}^T H_{(n+1)})}{\left\| \frac{\partial L}{\partial H_{(n+1)}}(I - H_{(n+1)}^T H_{(n+1)}) \right\|}. \quad (6)$$

Next, feature learning system 405 can update $\{a_k \in \{0,1\}, k=1, 2, \ldots, |T| \cdot |C|\}$. To update $\{a_k \in \{0,1\}, k=1, 2, \ldots, |T| \cdot |C|\}$ feature learning system 405 can compute $\text{MAX} = \max_{k=1}^{|T| \cdot |C|} \max_{i=1}^{K} |H_{(n+1),x} \cdot Z_k|$. Then, feature learning system 405 can update each $a_k$ so that if $\text{MAX} = \max_{k=1}^{|T| \cdot |C|} \max_{i=1}^{K} |H_{(n+1),x} \cdot Z_k| > \theta^* \text{MAX}$ for some value of $0 < \theta < 1$, feature learning system 405 sets $a_k = 0$ and otherwise, sets $a_k = 1$. The parameter t can be tuned for the speed of convergence of Relationship (6).

Feature learning system 405 can select initializations of the variables. The optimal value of the slack variable $a_k$ can take the value 1 if, and only if, the sub-population feature(s) of the corresponding pair are equal in value once premultiplied by $H_{(n+1)}$. For an initial choice of $\{a_k \in \{0,1\}, k=1, 2, \ldots, |T| \cdot |C|\}$, feature learning system 405 can look for an appropriate $H_{(n+1)}$ for which the sub-population feature(s) of the corresponding pair are equal in value once premultiplied by $H_{(n+1)}$ for every pair and choose $a_k = 1$ for $k=1, 2, \ldots, |T| \cdot |C|$. For the initial choice of $H_n$ feature learning system 405 can perturb the last found solution a little as shown by Relationship (7), as follows:

$$H_{(n=1)}^{initial} = H_n + \epsilon \frac{\frac{\partial L}{\partial H_n} \cdot (1 - H_n^T H_n)}{\left\| \frac{\partial L}{\partial H_n} \cdot (1 - H_n^T H_n) \right\|} \quad (7)$$

Note that $H_n$ can be the optimal solution for Relationship (4) with n replaced by (n−1). So, $H_n$ can satisfy all the constraints on $H_{(n+1)}$ except for the additional constraint imposed when n is incremented by 1 in Relationship (4), that is, $H_{(n+1)}$ cannot belong to $\mathcal{R}(H_n)$. Ideally, the perturbation in Relationship (7) can satisfy all constraints on $H_{(n+1)}$. For initialization of $H_1$, feature learning system 405 can start with K×K identity matrix appended by a zero matrix of dimensions K×(F−K).

Below, Table 1 outlines a procedure by which feature learning system 405 can select $H_{(n+1)}$:

TABLE 1

1: SEARCH FOR $H_{(n+1)}$ (Start with $H_{(n+1)} = H_{(n=1)}^{initial}$ as in Relationship (7).)
2: Start with $a_k = 1 \forall k = 1,2, \ldots, |T| \cdot |C|$.
3: Compute $\Delta_i = \sum_{k=1}^{|T| \cdot |C|} - \text{sign}(H_{(n+1),i} \cdot Z_{-k}) a_k Z_{-k}^T \forall i = 1,2, \ldots K$ and $$\text{MAX} = \max_{k=1}^{|T| \cdot |C|} \max_{i=1}^{K} |H_{(n+1),i} \cdot Z_{-k}|$$

4: If MAX < γ, STOP.

5: If $\frac{\partial L}{\partial H_{(n+1)}} \cdot (1 - H_{(n+1)}^T H_{(n+1)}) = [\Delta + H_{(n+1)}(\sum_{i=1}^{n} (1 - H_i^T H_i))](1 - H_{(n+1)}^T H_{(n+1)}) \neq 0$, update $H_{(n+1)}$ as in Relationship (6), else if $a_k$-s are updated at least once, STOP, else try a different initial $H_{(n+1)}$, say, by changing $\epsilon$ in Relationship (7).
6: Orthonormalize rows of $H_{(n+1)}$ following Gram-Schmidt algorithm.
7: Set $a_k = 0$ if $\max_{i=1}^{K} |H_{(n+1),i} \cdot Z_{-k}| > \theta \cdot \text{MAX}$, otherwise, set $a_k = 1$.
8: Go back to step 3.
9: end procedure In some embodiments, a case individual may be associated with multiple of the set(s) of sub-population feature(s) identified from the gross population by feature learning system 405 using the optimization algorithm. While selecting content according to an alternative statistical model may increase a likelihood of feedback by the case individual for one or more sub-population features associated with the case individual, selecting content according to the same alternative statistical model may decrease a likelihood of feedback by the case individual for one or more other of the sub-population feature(s) associated with the case individual. Accordingly, in many embodiments, feature learning system 405 can limit the set(s) of sub-population feature(s) identified from the gross population to those set(s) of sub-population feature(s) having the most impact on engagement by the case individual.

For example, for a set of sub-population(s) S of the form $S = \{H \cdot x = \underline{v}\}$ which satisfy Relationship (1), feature learning system 405 can derive the valuation of a case individual x according to Relationship (8), as follows:

$$v(x) = \sum_{\{S, x \in S \text{ and } S \text{ satisfies } (1)\}} w_{S,x} v(S), \quad (8)$$

where the weights $w_{S,x}$ are described below, where w represents the weight of subpopulation S in determining the value of the intervention for instance x, and v(S) is the average valuation for the sub-population of case individuals S as found from the randomized experiment given by $v(S) = [y^{-T}|S] - [y^{-C}|S]$ where $[y^{-T}|S]$ and $[y^{-C}|S]$ represents the average metrics from the test and control sub-populations of case individuals, respectively, restricted to the sub-population of case individuals S. If no sub-population of case individuals satisfies the condition in the sum on the right hand side of Relationship (8), the value v(x) is the empty sum, which is 0.

The weights $w_{S,x}$ can have an inverse relationship with the volatility of the average feedback metric v(S), as higher volatility means less confidence in our estimate of the average valuation v(S) for the sub-population of case individuals S. Also, the weights $w_{S,x}$ can penalize bigger sub-populations of case individuals as sub-populations of case individuals reduce the volatility of v(S) by adding more case individuals and thus the individual valuations of the case individuals of sub-population of case individuals S are not necessarily close to the average valuation v(S) of the sub-population of case individuals S. Feature learning system 405 can compute the weights by solving Relationship 9, as follows:

$$\sum_{\{S | x \in S \text{ and } S \text{ satisfies } (1)\}} w_{S,x} = 1, \quad (9)$$

$$w_{S,x} \propto \frac{1}{\sigma[v(S)]} \sqrt{\frac{1}{|S|}},$$

where σ[v(S)] is the volatility of v(S), and |S| represents the size of subpopulation |S|. The case individual represented by its feature vector x can play a role in defining the weights through Relationship (8), where the summands are determined by x.

In many embodiments, when feature learning system 405 has identified the sub-population(s) of case individuals from the gross population of case individuals, feature learning system 405 can associate the set(s) of sub-population feature(s) associated with the sub-population(s) with the alternative statistical model(s) used to select the test content. Accordingly, the set(s) of sub-population features and the alternative statistical model(s) can be stored in feature database 501 (FIG. 5). In further embodiments, when feature learning system 405 evaluates differences in the average feedback metrics for statistical significance for test content selected according to multiple alternative statistical models, the sub-population feature(s) of sub-population(s) of case individuals identified from the gross population of case individuals that return statistically significant differences in average feedback metrics for multiple alternative statistical models can be associated with the alternative statistical model that results in the most statistically significant difference in average feedback metrics. For example, in some embodiments, the models can involve a level of significance l, in which l is a configurable parameter in the model.

In many embodiments, the set(s) of sub-population feature(s) and the associated alternative statistical model(s) stored in feature database 501 (FIG. 5) can be used by a content provider to determine whether or not to select content to provide to one or more applied individuals according to the incumbent statistical model or one of the alternative statistical model(s). For example, where an applied individual is associated with one of the set(s) of sub-population feature(s) stored in feature database 501 (FIG. 5), a content provider can select content to provide to the applied individual according to the alternative statistical model associated with that set of sub-population feature(s). Meanwhile, where an applied individual is not associated with one of the set(s) of sub-population feature(s) stored in feature database 501 (FIG. 5), the content provider can select content to provide to the applied individual according to the incumbent statistical model. In some embodiments, the content provider can be the operator of system 300 (FIG. 3). However, in other embodiments, the content provider can be a third party.

Personalization System 406

Personalization system 406 can receive a request from an applied individual to access or receive content. For example, the content can comprise a website, and the applied individual may be requesting to visit the website. In many embodiments, personalization system 406 can receive the request from the applied individual to access or receive the content from one of contact computer systems 303 of FIG. 3 (e.g., contact computer system 309 (FIG. 3)) via communication system 404 (FIG. 4). Further, personalization system 406 can provide content to the one of contact computer systems 303 of FIG. 3 (e.g., contact computer system 309 (FIG. 3)) in response to receiving the request from the applied individual to access or receive content.

In many embodiments the techniques described here provide one or more technical improvements. For example, the techniques described herein provide a more fine-tuned personalization or customization of webpage content over using any combination of one or more single personalization methods due to the ability to combine several methods of personalization together. In the absence of the techniques described in this disclosure, other attempts would rely on human guesswork as to which personalization method could be superior to other personalization methods for one or more sets of users, which would involve numerous experiments to test the numerous hypotheses generated based the human guesswork. The possible subset of users grows exponentially as the number of users increase, which in turn involves an exponential increase in A/B testing. The techniques described here can advantageously provide an artificially intelligent system the removes the guesswork previously relied upon, in which the set-up involves a single A/B test to understand which method of personalization performs better for which set of users, to more accurately generate the preferred system for a set of users.

In some embodiments, before providing content to the one of contact computer systems 303 of FIG. 3 (e.g., contact computer system 309 (FIG. 3)) being used by the applied individual, personalization system 406 can identify the applied individual. Personalization system 406 can use any suitable methodology for identifying the applied individual. For example, personalization system 406 can request and receive identifying information (e.g., user name, password, name, mailing address, telephone number, and/or email address, etc.) about the applied individual. In some embodiments, personalization system 406 can request the identifying information at the one of contact computer systems 303 of FIG. 3 (e.g., contact computer system 309 (FIG. 3)) being used by the applied individual, and the applied individual can use the one of contact computer systems 303 of FIG. 3 (e.g., contact computer system 309 (FIG. 3)) to provide the identifying information to personalization system 406 via communication system 404. In further embodiments, personalization system 406 can generate a user profile for the applied individual, including the identifying information, and store the user profile at identification database(s) 502 (FIG. 5). When the applied individual is already associated with a user profile, personalization system 406 can request and receive part of the identifying information (e.g., user name and password) and retrieve the remaining identifying information, as needed, from identification database(s) 502 (FIG. 5).

In many embodiments, identifying the applied individual can comprise determining that the applied individual is associated with one or more sub-population features. Personalization system 406 can use any suitable methodology to determine that the applied individual is associated with the sub-population feature(s). In many embodiments, personalization system 406 can request and receive at least part of the sub-population feature(s) associated with the applied individual when requesting and receiving identifying information for the applied individual. In these or other embodiments, personalization system 406 can determine at least part of the sub-population feature(s) associated with the applied individual by tracking the behavior of the applied individual, such as, for example, using a hypertext transfer protocol cookie or the like. In some embodiments, personalization system 406 can store the sub-population feature(s) associated with the applied individual at identification database(s) 502 (FIG. 5), and can retrieve the sub-population feature(s) associated with the applied individual in conjunction with receiving the identifying information for the applied individual.

In many embodiments, personalization system 406 can reference feature database(s) 501 (FIG. 5) in view of the sub-population feature(s) associated with the applied individual to determine whether or not to select content to provide to the applied individuals according to an incumbent statistical model or one of the alternative statistical model(s). For example, when the sub-population feature(s) associated with the applied individual match a set of sub-population feature(s) stored at feature database(s) 501 (FIG. 5), personalization system 406 can provide content to the applied individual (e.g., a version of a website) formatted according to the alternative statistical model associated with the set of sub-population feature(s) stored at feature database(s) 501 (FIG. 5), such as, for example, rather than providing content to the applied individual (e.g., a version of a website) formatted according to the incumbent statistical model.

For simplicity, the functionality of personalization system 406 generally is described herein as it relates particularly to contact computer system 309 of contact computer system(s) 303 and a single applied individual, but in many embodiments, the functionality of personalization system 406 can be extended to multiple applied individuals and multiple of contact computer system(s) 303, at the same or at different times.

Figure 6:
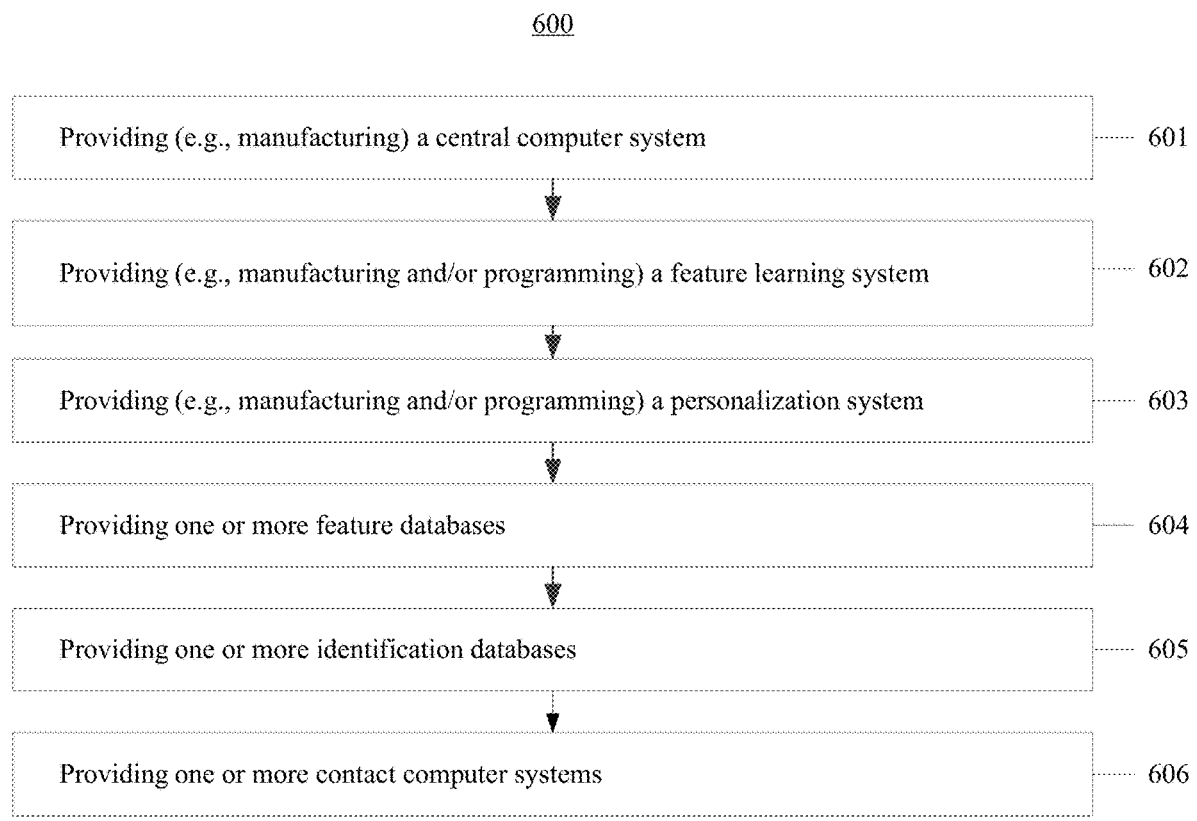
FIG. 6 illustrates a flow chart for a method of providing a system, according to an embodiment.

Turning ahead now in the drawings, FIG. 6 illustrates a flow chart for an embodiment of a method 600 of providing (e.g., manufacturing) a system. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of the method 600 can be performed in any other suitable order. In still other embodiments, one or more of the activities in method 600 can be combined or skipped. In many embodiments, the system can be similar or identical to system 300 (FIG. 3).

In many embodiments, method 600 can comprise activity 601 of providing (e.g., manufacturing) a central computer system. For example, the central computer system can be similar or identical to central computer system 301 (FIG. 3).

In many embodiments, method 600 can comprise activity 602 of providing (e.g., manufacturing and/or programming) a feature learning system. The feature learning system can be similar or identical to feature learning system 405 (FIG. 4). In some embodiments, activity 602 can be part of activity 601.

In many embodiments, method 600 can comprise activity 603 of providing (e.g., manufacturing and/or programming) a personalization system. The personalization system can be similar or identical to personalization system 406 (FIG. 4). In some embodiments, activity 603 can be part of activity 601. In further embodiments, activity 603 can be part of activity 602, and vice versa.

In some embodiments, method 600 can comprise activity 604 of providing one or more feature databases. The feature database(s) can be similar or identical to feature database(s) 501 (FIG. 5).

In some embodiments, method 600 can comprise activity 605 of providing one or more identification databases. The identification database(s) can be similar or identical to identification database(s) 502 (FIG. 5). In other embodiments activity 605 can be omitted. In further embodiments, activity 605 can be part of activity 604, and vice versa.

In some embodiments, method 600 can comprise activity 606 of providing one or more contact computer systems. The contact computer system(s) can be similar or identical to contact computer system(s) 303 (FIG. 3). In other embodiments, activity 606 can be omitted.

Turning ahead now in the drawings, FIG. 7 illustrates a flow chart for an embodiment of a method 700. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of the method 700 can be performed in any other suitable order. In still other embodiments, one or more of the activities in method 700 can be combined or skipped.

In many embodiments, method 700 can comprise activity 701 of identifying one or more sub-populations of case individuals from a gross population of case individuals. In many embodiments, performing activity 701 can be similar or identical to identifying one or more sub-populations of case individuals from a gross population of case individuals as described above with respect to system 300 (FIG. 3) and feature learning system 405 (FIG. 4). Further, the gross population of case individuals can be similar or identical to the gross population of case individuals described above with respect to system 300 (FIG. 3) and feature learning system 405 (FIG. 4), the sub-population(s) of case individual(s) can be similar or identical to the sub-population(s) of case individuals described above with respect to system 300 (FIG. 3) and feature learning system 405 (FIG. 4), and the case individuals can be similar or identical to the case individuals described above with respect to system 300 (FIG. 3) and/or feature learning system 405 (FIG. 4). FIG. 8 illustrates an exemplary activity 701, according to the embodiment of FIG. 7.

Figure 9:
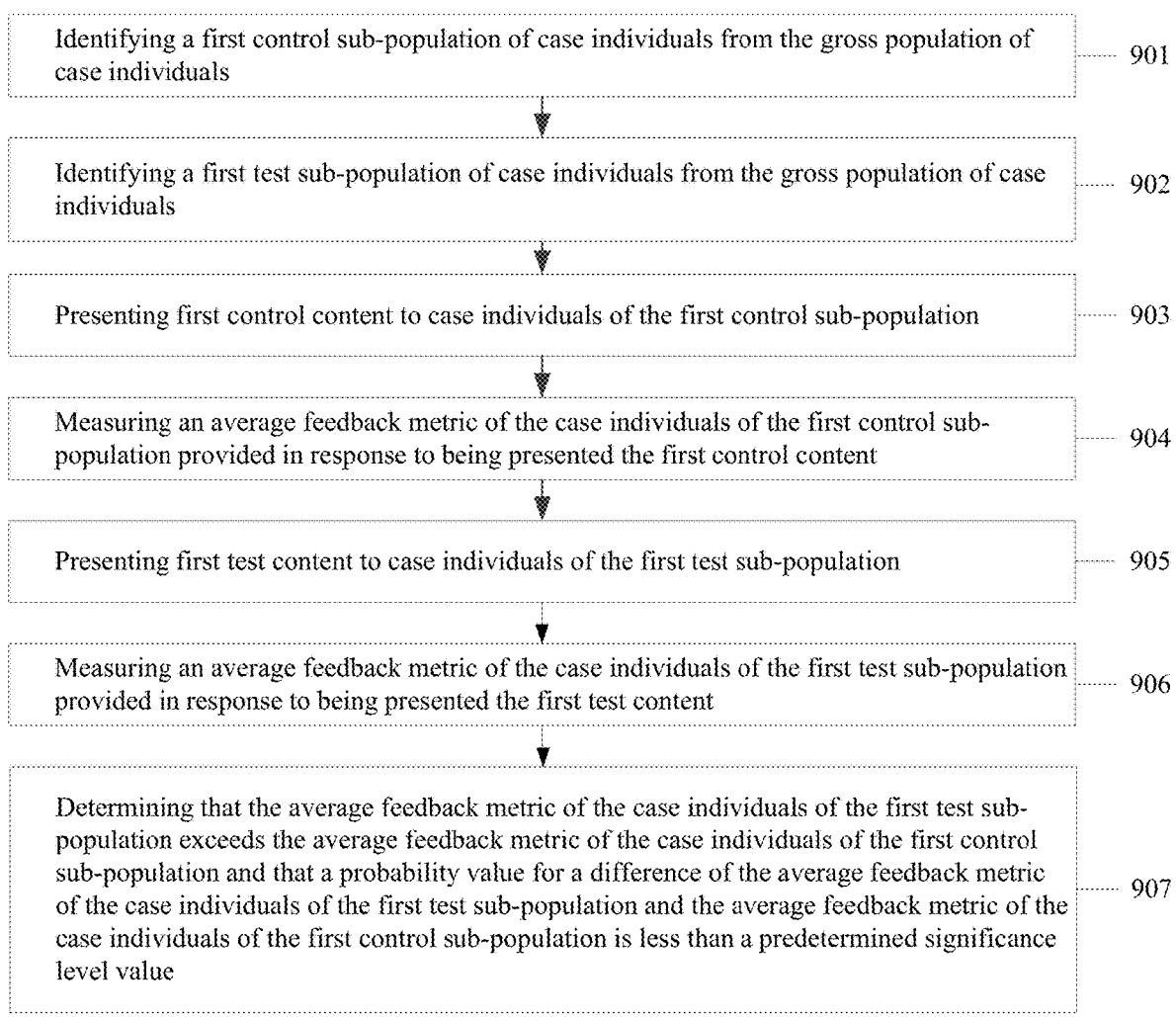
FIG. 9 illustrates an exemplary activity of identifying a first sub-population of case individuals from the gross population of case individuals, according to the embodiment of FIG. 7.

In many embodiments, activity 701 can comprise activity 801 of identifying a first sub-population of case individuals from the gross population of case individuals. In many embodiments, performing activity 801 can be similar or identical to identifying a first sub-population of case individuals from the gross population of case individuals as described above with respect to system 300 (FIG. 3) and feature learning system 405 (FIG. 4). For example, case individuals of the first sub-population of case individuals can be associated with at least one first sub-population feature. Further, the first sub-population feature(s) can be similar or identical to one or more of the sub-population feature(s) described above with respect to system 300 (FIG. 3) and feature learning system 405 (FIG. 4). FIG. 9 illustrates an exemplary activity 801, according to the embodiment of FIG. 7.

In many embodiments, activity 801 can comprise activity 901 of identifying a first control sub-population of case individuals from the gross population of case individuals. In many embodiments, performing activity 901 can be similar or identical to identifying a first control sub-population of case individuals from the gross population of case individuals as described above with respect to system 300 (FIG. 3) and feature learning system 405 (FIG. 4). Further, the first control sub-population of case individuals can be similar or identical to one of the control sub-populations of case individuals described above with respect to system 300 (FIG. 3) and feature learning system 405 (FIG. 4).

In many embodiments, activity 801 can comprise activity 902 of identifying a first test sub-population of case individuals from the gross population of case individuals. In many embodiments, performing activity 902 can be similar or identical to identifying a first test sub-population of case individuals from the gross population of case individuals as described above with respect to system 300 (FIG. 3) and feature learning system 405 (FIG. 4). Further, the first test sub-population of case individuals can be similar or identical to one of the test sub-populations of case individuals described above with respect to system 300 (FIG. 3) and feature learning system 405 (FIG. 4).

In many embodiments, activity 801 can comprise activity 903 of presenting first control content to case individuals of the first control sub-population. In many embodiments, performing activity 903 can be similar or identical to presenting first control content to case individuals of the first control sub-population as described above with respect to system 300 (FIG. 3) and feature learning system 405 (FIG. 4). Further, the first control content can be similar or identical to the control content described above with respect to system 300 (FIG. 3) and feature learning system 405 (FIG. 4).

In many embodiments, activity 801 can comprise activity 904 of measuring an average feedback metric of the case individuals of the first control sub-population provided in response to being presented the first control content. In many embodiments, performing activity 904 can be similar or identical to measuring an average feedback metric of the case individuals of the first control sub-population provided in response to being presented the first control content as described above with respect to system 300 (FIG. 3) and feature learning system 405 (FIG. 4). Further, the feedback metric can be similar or identical to the feedback metric described above with respect to system 300 (FIG. 3) and feature learning system 405 (FIG. 4).

In many embodiments, activity 801 can comprise activity 905 of presenting first test content to case individuals of the first test sub-population. In many embodiments, performing activity 905 can be similar or identical to presenting first test content to case individuals of the first test sub-population as described above with respect to system 300 (FIG. 3) and feature learning system 405 (FIG. 4). Further, the first test content can be similar or identical to the test content described above with respect to system 300 (FIG. 3) and feature learning system 405 (FIG. 4).

In many embodiments, activity 801 can comprise activity 906 of measuring an average feedback metric of the case individuals of the first test sub-population provided in response to being presented the first test content. In many embodiments, performing activity 906 can be similar or identical to measuring an average feedback metric of the case individuals of the first test sub-population provided in response to being presented the first test content as described above with respect to system 300 (FIG. 3) and feature learning system 405 (FIG. 4).

In many embodiments, activity 801 can comprise activity 907 of determining that the average feedback metric of the case individuals of the first test sub-population exceeds the average feedback metric of the case individuals of the first control sub-population and that a probability value for a difference of the average feedback metric of the case individuals of the first test sub-population and the average feedback metric of the case individuals of the first control sub-population is less than a predetermined significance level value. In many embodiments, performing activity 907 can be similar or identical to determining that the average feedback metric of the case individuals of the first test sub-population exceeds the average feedback metric of the case individuals of the first control sub-population and that a probability value for a difference of the average feedback metric of the case individuals of the first test sub-population and the average feedback metric of the case individuals of the first control sub-population is less than a predetermined significance level value as described above with respect to system 300 (FIG. 3) and feature learning system 405 (FIG. 4). Further, the predetermined significance level value can be similar or identical to the predetermined significance level value described above with respect to system 300 (FIG. 3) and feature learning system 405 (FIG. 4).

Referring now back to FIG. 8, in many embodiments, activity 801 can be repeated one or more times to identify one or more other sub-populations of case individuals from the gross population of case individuals, as described above with respect to system 300 (FIG. 3) and feature learning system 405 (FIG. 4). The sub-population feature(s) associated with each of the first sub-population of case individuals and the other sub-population(s) of case individuals can differ by at least one sub-population feature. In some embodiments, activity 801 can be performed one or more times with different test content for activities 905-907, as described above with respect to system 300 (FIG. 3) and feature learning system 405 (FIG. 4). Further, when activity 801 is repeated one or more times to identify other sub-population(s) of case individuals, in some embodiments, different control sub-populations of case individuals and test sub-populations of case individuals can be used, and in other embodiments, the same control sub-populations of case individuals and test sub-populations of case individuals can be used. In many embodiments, each repetition of activity 801 can be performed serially, while in other embodiments, each repetition of activity 801 can be performed in parallel to each other.

Referring now back to FIG. 7, in many embodiments, method 700 can comprise activity 702 of receiving a request to receive or access content from an applied individual. In many embodiments, performing activity 702 can be similar or identical to receiving a request to receive or access content from an applied individual as described above with respect to system 300 (FIG. 3) and personalization system 406 (FIG. 4). In many embodiments, activity 702 can be performed after activity 701. In some embodiments, activity 702 can be omitted.

In many embodiments, method 700 can comprise activity 703 of identifying the applied individual. In many embodiments, performing activity 702 can be similar or identical to identifying the applied individual as described above with respect to system 300 (FIG. 3) and personalization system 406 (FIG. 4). In many embodiments, activity 703 can be performed after activity 701 and activity 702. In some embodiments, activity 703 can be omitted.

In many embodiments, method 700 can comprise activity 704 of presenting a second version of the content to the applied individual instead of a first version of the content. In many embodiments, performing activity 702 can be similar or identical to presenting a second version of the content to the applied individual instead of a first version of the content as described above with respect to system 300 (FIG. 3) and personalization system 406 (FIG. 4). In many embodiments, activity 704 can be performed after activity 701, activity 702, and activity 703. In some embodiments, activity 704 can be performed in response to activity 703. In further embodiments, activity 704 can be omitted.

In several embodiments, the systems described herein advantageously can transform a traditionally subjective process performed by humans, which applied subjective human manual determinations or guesses, into a streamlined process using a single A/B test data to determine which personalization method is working better for a particular subset of users. By incorporating the rules described in this disclosure, the systems described herein provide an improvement over the conventional approaches by reducing the number of A/B tests performed in order to understand which personalization method to select for a set of users, and by removing human guesswork in determining whether a group of users prefers a different method of personalization.

The techniques described herein are rooted in computer technologies that overcome existing problems in database systems, which can increase available bandwidth, reduce network traffic, and efficiently manage databases. Conventional database systems cannot handle massive amounts of network traffic or database requests, while keeping latency to an acceptable level and/or avoiding server crashes. The techniques described herein can provide a technical solution, such as one that utilizes databases in a novel arrangement. This technology-based solution marks an improvement over existing computing capabilities and functionalities related to database systems by improving bandwidth, reducing network traffic, and permitting greater database efficiency (e.g., by processing combined read/delete requests). The systems can improve the way databases store, retrieve, delete, and/or transmit data.

In many embodiments, the techniques described herein can provide several technological improvements. Specifically, the techniques described herein can reduce network load by enabling users to find relevant information faster. By reducing the network load, the systems and methods described herein can help to improve performance of the CPU, memory and cache for recommendation systems. This improvement can directly reduce the number of service calls per second and/or can translate into better usage of various system components like CPU, memory, hard disk, etc. As described above, the methods and systems described herein can process huge amount of data efficiently and allow recommendation systems to isolate or filter for one or more sets of users that have different preferences for content over other sets of users in the technical field of customizing webpage content based on user preferences and user information. Once the webpage content preferred by a set of users is determined, the set of users can be presented with content that is relevant, as opposed to a generalized pool of items, hence reducing the number of pages the user would browse in order to reach the content for which they are interested.

This approach is different from conventional approaches, which applied subjective, manual human determinations. In many embodiments, the method described herein can cover the identification itself of different sets of users, which can advantageously apply to any approach of identifying content recommendations. This level of personalization for transmitting content recommendations does not exist in conventional approaches to targeted content to particular groups or sets of users. Because these described methods cover the identification of different sets of users with similar content preferences itself, in some embodiments, any approach of identifying content recommendations can be used. The level of personalization in the timing of when the user reviews the customized content does not exist in conventional approaches, which typically transmit recommendations to each user at a present time after a certain action, or to all of a group of users at the same time after a certain event.

A number of embodiments include a system. The system can include one or more processors and one or more non-transitory memory storage devices storing computer instructions configured to run on the one or more processors and perform identifying one or more sub-populations of case individuals from a gross population of case individuals. Identifying the one or more sub-populations of case individuals from the gross population of case individuals can comprise identifying a first sub-population of case individuals from the gross population of case individuals. The one or more sub-populations of case individuals can comprise the first sub-population of case individuals. Case individuals of the first sub-population of case individuals can be associated with at least one first sub-population feature. Identifying the first sub-population of case individuals from the gross population of case individuals can comprise identifying a first control sub-population of case individuals from the gross population of case individuals. Identifying the first control sub-population of case individuals from the gross population of case individuals can comprise grouping together first case individuals randomly selected from case individuals of the gross population of case individuals to form the first control sub-population of case individuals. The first case individuals can be associated with the at least one first sub-population feature. Identifying the first sub-population of case individuals from the gross population of case individuals can also can comprise identifying a first test sub-population of case individuals from the gross population of case individuals. Identifying the first test sub-population of case individuals from the gross population of case individuals can comprise grouping together second case individuals randomly selected from the case individuals of the gross population of case individuals to form the first test sub-population of case individuals. The first case individuals can be exclusive from the second case individuals. The second case individuals can be associated with the at least one first sub-population feature. The first case individuals and the second case individuals together can comprise the case individuals of the first sub-population of case individuals. Identifying the first sub-population of case individuals from the gross population of case individuals can comprise presenting first control content to case individuals of the first control sub-population. The first control content can be selected according to a first statistical model. Identifying the first sub-population of case individuals from the gross population of case individuals additionally can comprise measuring an average feedback metric of the case individuals of the first control sub-population provided in response to being presented the first control content. Identifying the first sub-population of case individuals from the gross population of case individuals further can comprise presenting first test content to case individuals of the first test sub-population. The first test content can be selected according to a second statistical model different than the first statistical model. Identifying the first sub-population of case individuals from the gross population of case individuals additionally can comprise measuring an average feedback metric of the case individuals of the first test sub-population provided in response to being presented the first test content. Identifying the first sub-population of case individuals from the gross population of case individuals further can comprise determining that the average feedback metric of the case individuals of the first test sub-population exceeds the average feedback metric of the case individuals of the first control sub-population and that a probability value for a difference of the average feedback metric of the case individuals of the first test sub-population and the average feedback metric of the case individuals of the first control sub-population is less than a predetermined significance level value.

Various embodiments include a method. The method can include being implemented via execution of computer instructions configured to run at one or more processors and configured to be stored at one or more non-transitory memory storage devices. Identifying one or more sub-populations of case individuals from a gross population of case individuals can comprise identifying the one or more sub-populations of case individuals from the gross population of case individuals. Identifying a first sub-population of case individuals from the gross population of case individuals can include the one or more sub-populations of case individuals comprising the first sub-population of case individuals. Case individuals of the first sub-population of case individuals are associated with at least one first sub-population feature. Identifying the first sub-population of case individuals from the gross population of case individuals comprises identifying a first control sub-population of case individuals from the gross population of case individuals. Identifying the first control sub-population of case individuals from the gross population of case individuals comprises grouping together first case individuals randomly selected from case individuals of the gross population of case individuals to form the first control sub-population of case individuals. The first case individuals are associated with the at least one first sub-population feature. Identifying a first test sub-population of case individuals from the gross population of case individuals can also comprise identifying the first test sub-population of case individuals from the gross population of case individuals comprises grouping together second case individuals randomly selected from the case individuals of the gross population of case individuals to form the first test sub-population of case individuals. The first case individuals are exclusive from the second case individuals. The second case individuals are associated with the at least one first sub-population feature. The first case individuals and the second case individuals together comprise the case individuals of the first sub-population of case individuals presenting first control content to case individuals of the first control sub-population. The first control content is selected according to a first statistical model measuring an average feedback metric of the case individuals of the first control sub-population provided in response to being presented the first control content presenting first test content to case individuals of the first test sub-population. The first test content is selected according to a second statistical model different than the first statistical model measuring an average feedback metric of the case individuals of the first test sub-population provided in response to being presented the first test content. Determining that the average feedback metric of the case individuals of the first test sub-population exceeds the average feedback metric of the case individuals of the first control sub-population. Determining that a probability value for a difference of the average feedback metric of the case individuals of the first test sub-population and the average feedback metric of the case individuals of the first control sub-population is less than a predetermined significance level value.

Many embodiments can include a system. The system can include comprising one or more processors and one or more non-transitory memory storage devices storing computer instructions configured to run on the one or more processors and perform identifying one or more sub-populations of case individuals from a gross population of case individuals. Identifying the one or more sub-populations of case individuals from the gross population of case individuals comprises identifying a first sub-population of case individuals from the gross population of case individuals. The one or more sub-populations of case individuals comprise the first sub-population of case individuals. Case individuals of the first sub-population of case individuals are associated with at least one first sub-population feature. Identifying the first sub-population of case individuals from the gross population of case individuals comprises identifying a first control sub-population of case individuals from the gross population of case individuals. Identifying the first control sub-population of case individuals from the gross population of case individuals comprises grouping together first case individuals randomly selected from case individuals of the gross population of case individuals to form the first control sub-population of case individuals. The first case individuals are associated with the at least one first sub-population feature identifying a first test sub-population of case individuals from the gross population of case individuals. Identifying the first test sub-population of case individuals from the gross population of case individuals comprises grouping together second case individuals randomly selected from the case individuals of the gross population of case individuals to form the first test sub-population of case individuals. The first case individuals are exclusive from the second case individuals. The second case individuals are associated with the at least one first sub-population feature. The first case individuals and the second case individuals together comprise the case individuals of the first sub-population of case individuals presenting first control content to case individuals of the first control sub-population. The first control content is selected according to a first statistical model measuring an average feedback metric of the case individuals of the first control sub-population provided in response to being presented the first control content presenting first test content to case individuals of the first test sub-population. The first test content is selected according to a second statistical model different than the first statistical model measuring an average feedback metric of the case individuals of the first test sub-population provided in response to being presented the first test content. Determining that the average feedback metric of the case individuals of the first test sub-population exceeds the average feedback metric of the case individuals of the first control sub-population and that a probability value for a difference of the average feedback metric of the case individuals of the first test sub-population and the average feedback metric of the case individuals of the first control sub-population is less than a predetermined significance level value. After identifying the one or more sub-populations of case individuals from the gross population of case individuals identifying a first applied individual visiting a website. Identifying the first applied individual visiting the website comprises determining that the first applied individual is associated with the at least one first sub-population feature and presenting a second version of the website to the first applied individual instead of a first version of the website in response to determining that the first applied individual is associated with the at least one first sub-population feature. The first version of the website is selected according to the first statistical model and the second version of the website is selected according to the second statistical model.

A number of embodiments can include a system. The system can include comprising one or more processors and one or more non-transitory media storing computer instructions configured to run on the one or more processors and perform certain acts. The acts can include identifying a first sub-population of case individuals from a gross population of the case individuals. The first sub-population of the case individuals can be associated with at least one first sub-population feature. The acts also can include presenting first test content to a first test sub-population of the case individuals of the first sub-population of the case individuals. The first test content can be selected according to a first statistical model. The first statistical model can include measuring a first test sub-population average feedback metric based on first test content feedback provided from the first test sub-population of the case individuals in response to being presented the first test content. The first statistical model also can include determining that the first test sub-population average feedback metric exceeds a first control population average feedback metric of a first control population of the case individuals. The first control population of the case individuals can be distinct from the first test sub-population of the case individuals. The first statistical model further can include determining that a probability value for a difference between the first test sub-population average feedback metric and the first control population average feedback metric can be less than a predetermined significance level value.

Various embodiments can include a method. The method can include being implemented via execution of computer instructions configured to run at one or more processors and configured to be stored at one or more non-transitory memory storage devices. The method can include identifying a first sub-population of case individuals from a gross population of the case individuals. The first sub-population of the case individuals can be associated with at least one first sub-population feature. The method also can include presenting first test content of a first test sub-population of the case individuals of the first sub-population of the case individuals. The first test content can be selected according to a first statistical model. The first statistical model can include measuring a first test sub-population average feedback metric based on first test content feedback provided from the first test sub-population of the case individuals in response to being presented the first test content. The first statistical model also can include determining that the first test sub-population average feedback metric exceeds a first control population average feedback metric of a first control population of the case individuals. The first control population of the case individuals can be distinct from the first test sub-population of the case individuals. The first statistical model further can include determining that a probability value for a difference between the first test sub-population average feedback metric and the first control population average feedback metric can be less than a predetermined significance level value.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within central computer system 301 and/or contact computer system(s) 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
identifying, using an optimization algorithm of a feature learning system, a first sub-population of case individuals from a gross population of the case individuals, the first sub-population of the case individuals are associated with at least one first sub-population feature;
selecting, using a first statistical model of the feature learning system, first test content to present to a first test sub-population of the case individuals of the first sub-population of the case individuals;
measuring a first test sub-population average feedback metric based on a first test content feedback provided from the first test sub-population of the case individuals in response to being presented the first test content;
selecting, using a second statistical model different than the first statistical model of the feature learning system, a first control content to present to a first control population of the case individuals;
measuring a first control population average feedback metric based on a first control content feedback provided from the first control population of the case individuals in response to being presented the first control content;
determining, using the optimization algorithm of the feature learning system, that the first test sub-population average feedback metric exceeds the first control population average feedback metric of the first control population of the case individuals, wherein the first control population of the case individuals are distinct from the first test sub-population of the case individuals;
determining, using the optimization algorithm of the feature learning system, that a probability value for a difference between the first test sub-population average feedback metric and the first control population average feedback metric is less than a predetermined significance level value; and
determining, using the optimization algorithm of the feature learning system, whether to select the first test content or the first control content to display to a first applied individual of one or more applied individuals, wherein the first test content comprises a first version of a website, and wherein the first control content comprises a second version of the website.

2. A system of claim 1, wherein the computing instructions, when executed on the one or more processors, further cause the one or more processors to perform operations comprising:
identifying, using the optimization algorithm of the feature learning system, one or more sub-populations of the case individuals from the gross population of the case individuals, wherein identifying the one or more sub-populations of the case individuals from the gross population of the case individuals comprises:

identifying a first control sub-population of the case individuals from the first control population from the gross population of the case individuals, wherein identifying the first control sub-population of the case individuals from the gross population of the case individuals comprises grouping together first case individuals randomly selected from the gross population of the case individuals to form the first control sub-population of the case individuals, and wherein the first case individuals are associated with the at least one first sub-population feature; and measuring a first control sub-population average feedback metric based on the first control content feedback provided from the first control sub-population of the case individuals in response to being presented the first control content; and wherein:

identifying the first sub-population of the case individuals from the gross population of the case individuals further comprises:

grouping together second case individuals randomly selected from the gross population of the case individuals to form the first test sub-population of the case individuals, wherein the first case individuals are exclusive from the second case individuals, the second case individuals are associated with the at least one first sub-population feature, and wherein the first case individuals and the second case individuals together comprise the first sub-population of the case individuals.

3. The system of claim 2, wherein the computing instructions, when executed on the one or more processors, cause the one or more processors to perform operations comprising:

after identifying the one or more sub-populations of the case individuals from the gross population of the case individuals:

identifying, using the optimization algorithm of the feature learning system, the first applied individual of the one or more applied individuals visiting a website, wherein identifying the first applied individual visiting the website comprises determining that the first applied individual is associated with the at least one first sub-population feature; and presenting a second version of the website to the first applied individual of the one or more applied individuals instead of a first version of the website in response to determining that the first applied individual is associated with the at least one first sub-population feature, wherein the first version of the website is selected according to the first statistical model and the second version of the website is selected according to the second statistical model.

4. The system of claim 2, wherein the computing instructions when executed on the one or more processors, further cause the one or more processors to perform operations comprising:

identifying, using the optimization algorithm of the feature learning system, one or more sub-populations of the case individuals from the gross population of the case individuals, wherein the one or more sub-populations of the case individuals comprise the first sub-population of the case individuals, and wherein identifying the one or more sub-populations of the case individuals comprises:

identifying a second sub-population of the case individuals from the gross population of the case individuals, wherein the one or more sub-populations of the case individuals comprise the second sub-population of the case individuals, wherein the second sub-population of the case individuals are associated with at least one second sub-population feature, wherein the at least one second sub-population feature differs from the at least one first sub-population feature, and wherein identifying the second sub-population of the case individuals from the gross population of the case individuals comprises:

identifying a second control sub-population of the case individuals from a second control population from the gross population of the case individuals, wherein identifying the second control sub-population of the case individuals from the gross population of the case individuals comprises grouping together third case individuals randomly selected from the gross population of the case individuals to form the second control sub-population of the case individuals, and wherein the third case individuals are associated with the at least one second sub-population feature;

identifying a second test sub-population of the case individuals from the gross population of the case individuals, wherein identifying the second test sub-population of the case individuals from the gross population of the case individuals comprises grouping together fourth case individuals randomly selected from the gross population of the case individuals to form the second test sub-population of the case individuals, wherein the third case individuals are exclusive from the fourth case individuals, wherein the fourth case individuals are associated with the at least one second sub-population feature, and wherein the third case individuals and the fourth case individuals together comprise the second sub-population of the case individuals;

presenting the first control content to the second control sub-population of the case individuals;

measuring a second control sub-population average feedback metric based on the first control content feedback provided from the second control sub-population of the case individuals in response to being presented the first control content;

presenting the first test content to the second test sub-population of the case individuals;

measuring a second test sub-population average feedback metric based on of the first test content feedback provided from the second test sub-population of the case individuals in response to being presented the first test content; and determining that the second test sub-population average feedback metric exceeds a second control population average feedback metric of the second control sub-population of the case individuals, wherein the second control sub-population of the case individuals are distinct from the second test sub-population of the case individuals; and determining that a probability value for a difference between the second test sub-population average feedback metric and the second control sub-population average feedback metric is less than the predetermined significance level value.

5. The system of claim 2, wherein the computing instructions when executed on the one or more processors, further cause the one or more processors to perform operations comprising:
identifying, using the optimization algorithm of the feature learning system, one or more sub-populations of the case individuals from the gross population of the case individuals, wherein the one or more sub-populations of the case individuals comprise the first sub-population of the case individuals, and wherein identifying the one or more sub-populations of the case individuals comprises:
identifying a second sub-population of the case individuals from the gross population of the case individuals, wherein the one or more sub-populations of the case individuals comprise the second sub-population of the case individuals, wherein the second sub-population of the case individuals are associated with the at least one first sub-population feature and at least one second sub-population feature, wherein the at least one second sub-population feature differs from the at least one first sub-population feature, and wherein identifying the second sub-population of the case individuals from the gross population of the case individuals comprises:
identifying a second control sub-population of the case individuals from the gross population of the case individuals, wherein identifying the second control sub-population of the case individuals from the gross population of the case individuals comprises grouping together third case individuals randomly selected from the gross population of the case individuals to form the second control sub-population of the case individuals, and wherein the third case individuals are associated with the at least one first sub-population feature and the at least one second sub-population feature;
identifying a second test sub-population of the case individuals from the gross population of the case individuals, wherein identifying the second test sub-population of the case individuals from the gross population of the case individuals comprises grouping together fourth case individuals randomly selected from the gross population of the case individuals to form the second test sub-population of the case individuals, wherein the third case individuals are exclusive from the fourth case individuals, wherein the fourth case individuals are associated with the at least one first sub-population feature and the at least one second sub-population feature, and wherein the third case individuals and the fourth case individuals together comprise the second sub-population of the case individuals;
presenting second control content to the second control sub-population of the case individuals, wherein the second control content is selected according to the first statistical model;
measuring a second control sub-population average feedback metric based on a second control content feedback provided from the second control sub-population of the case individuals in response to being presented the second control content;
presenting a second test content to the second test sub-population of the case individuals, wherein the second test content is selected according to a third statistical model different than the first statistical model and the second statistical model;
measuring a second test sub-population average feedback metric based on a second test content feedback from the second test sub-population of the case individuals in response to being presented the second test content; and
determining that the second test sub-population average feedback metric exceeds the second control sub-population average feedback metric of the second control sub-population of the case individuals; and
determining that a probability value for a difference between the second test sub-population average feedback metric and the second control sub-population average feedback metric is less than the predetermined significance level value.

6. The system of claim 2, wherein:
the first version of the website is selected according to the first statistical model; and
the second version of the website is selected according to the second statistical model.

7. The system of claim 2, wherein:
measuring, using the optimization algorithm of the feature learning system, the first control sub-population average feedback metric based on the first control content feedback provided from the first control sub-population of the case individuals further comprises an average feedback metric variance threshold value that comprises one of:
an average click-through-rate threshold value;
an average orders per session threshold value; or
average revenue per session threshold value.

8. The system of claim 2, wherein:
the gross population of the case individuals comprise people performing a same action.

9. The system of claim 1, wherein:
the at least one first sub-population feature comprises at least one of a gender, an age, a browsing act, or a purchase history.

10. The system of claim 2, wherein:
the first statistical model comprises one of a linear regression, a logistic regression, a Poisson regression, or a hierarchical tree-based regression; and
the second statistical model comprises an other one of the linear regression, the logistic regression, the Poisson regression, or the hierarchical tree-based regression.

11. A method being implemented via execution of computing instructions configured to run on one or more processors and stored at one or more non-transitory media, the method comprising:
identifying, using an optimization algorithm of a feature learning system, a first sub-population of case individuals from a gross population of the case individuals, the first sub-population of the case individuals are associated with at least one first sub-population feature;
selecting, using a first statistical model of the feature learning system, first test content to present to a first test sub-population of the case individuals of the first sub-population of the case individuals;
measuring a first test sub-population average feedback metric based on a first test content feedback provided from the first test sub-population of the case individuals in response to being presented the first test content;
selecting, using a second statistical model different than the first statistical model of the feature learning system, a first control content to present to a first control population of the case individuals;

measuring a first control population average feedback metric based on a first control content feedback provided from the first control population of the case individuals in response to being presented the first control content;

determining, using the optimization algorithm of the feature learning system, that the first test sub-population average feedback metric exceeds the first control population average feedback metric of the first control population of the case individuals, wherein the first control population of the case individuals are distinct from the first test sub-population of the case individuals;

determining, using the optimization algorithm of the feature learning system, that a probability value for a difference between the first test sub-population average feedback metric and the first control population average feedback metric is less than a predetermined significance level value; and determining, using the optimization algorithm of the feature learning system, whether to select the first test content or the first control content to display to a first applied individual of one or more applied individuals, wherein the first test content comprises a first version of a website, and wherein the first control content comprises a second version of the website.

12. The method of claim 11, further comprising:
identifying, using the optimization algorithm of the feature learning system, one or more sub-populations of the case individuals from the gross population of the case individuals, wherein identifying the one or more sub-populations of the case individuals from the gross population of the case individuals comprises:
identifying a first control sub-population of the case individuals from the first control population from the gross population of the case individuals, wherein identifying the first control sub-population of the case individuals from the gross population of the case individuals comprises grouping together first case individuals randomly selected from the gross population of the case individuals to form the first control sub-population of the case individuals, and wherein the first case individuals are associated with the at least one first sub-population feature; and
measuring a first control sub-population average feedback metric based on the first control content feedback provided from the first control sub-population of the case individuals in response to being presented the first control content; and
wherein:
identifying the first sub-population of the case individuals from the gross population of the case individuals further comprises:
grouping together second case individuals randomly selected from the gross population of the case individuals to form the first test sub-population of the case individuals, wherein the first case individuals are exclusive from the second case individuals, the second case individuals are associated with the at least one first sub-population feature, and wherein the first case individuals and the second case individuals together comprise the first sub-population of the case individuals.

13. The method of claim 12, further comprising:
after identifying the one or more sub-populations of the case individuals from the gross population of the case individuals:
identifying, using the optimization algorithm of the feature learning system, the first applied individual of the one or more applied individuals visiting a website, wherein identifying the first applied individual visiting the website comprises determining that the first applied individual is associated with the at least one first sub-population feature; and
presenting a second version of the website to the first applied individual of the one or more applied individuals instead of a first version of the website in response to determining that the first applied individual is associated with the at least one first sub-population feature, wherein the first version of the website is selected according to the first statistical model and the second version of the website is selected according to the second statistical model.

14. The method claim 12, further comprising:
identifying, using the optimization algorithm of the feature learning system, one or more sub-populations of the case individuals from the gross population of the case individuals, wherein the one or more sub-populations of the case individuals comprise the first sub-population of the case individuals, and wherein identifying the one or more sub-populations of the case individuals comprises:
identifying a second sub-population of the case individuals from the gross population of the case individuals, wherein the one or more sub-populations of the case individuals comprise the second sub-population of the case individuals, wherein the second sub-population of the case individuals are associated with at least one second sub-population feature, wherein the at least one second sub-population feature differs from the at least one first sub-population feature, and wherein identifying the second sub-population of the case individuals from the gross population of the case individuals comprises:
identifying a second control sub-population of the case individuals from a second control population from the gross population of the case individuals, wherein identifying the second control sub-population of the case individuals from the gross population of the case individuals comprises grouping together third case individuals randomly selected from the gross population of the case individuals to form the second control sub-population of the case individuals, and wherein the third case individuals are associated with the at least one second sub-population feature;
identifying a second test sub-population of the case individuals from the gross population of the case individuals, wherein identifying the second test sub-population of the case individuals from the gross population of the case individuals comprises grouping together fourth case individuals randomly selected from the gross population of the case individuals to form the second test sub-population of the case individuals, wherein the third case individuals are exclusive from the fourth case individuals, wherein the fourth case individuals are associated with the at least one second sub-population feature, and wherein the third case individuals and the fourth case individuals together comprise the second sub-population of the case individuals;

presenting the first control content to the second control sub-population of the case individuals;

measuring a second control sub-population average feedback metric based on the first control content feedback provided from the second control sub-population of the case individuals in response to being presented the first control content;

presenting the first test content to the second test sub-population of the case individuals;

measuring a second test sub-population average feedback metric based on of the first test content feedback provided from the second test sub-population of the case individuals in response to being presented the first test content; and determining that the second test sub-population average feedback metric exceeds a second control population average feedback metric of the second control sub-population of the case individuals, wherein the second control sub-population of the case individuals are distinct from the second test sub-population of the case individuals; and determining that a probability value for a difference between the second test sub-population average feedback metric and the second control sub-population average feedback metric is less than the predetermined significance level value.

15. The method of claim 12, further comprising:

identifying, using the optimization algorithm of the feature learning system, one or more sub-populations of the case individuals from the gross population of the case individuals, wherein the one or more sub-populations of the case individuals comprise the first sub-population of the case individuals, and wherein identifying the one or more sub-populations of the case individuals comprises:

identifying a second sub-population of the case individuals from the gross population of the case individuals, wherein the one or more sub-populations of the case individuals comprise the second sub-population of the case individuals, wherein the second sub-population of the case individuals are associated with the at least one first sub-population feature and at least one second sub-population feature, wherein the at least one second sub-population feature differs from the at least one first sub-population feature, and wherein identifying the second sub-population of the case individuals from the gross population of the case individuals comprises:

identifying a second control sub-population of the case individuals from the gross population of the case individuals, wherein identifying the second control sub-population of the case individuals from the gross population of the case individuals comprises grouping together third case individuals randomly selected from the gross population of the case individuals to form the second control sub-population of the case individuals, and wherein the third case individuals are associated with the at least one first sub-population feature and the at least one second sub-population feature;

identifying a second test sub-population of the case individuals from the gross population of the case individuals, wherein identifying the second test sub-population of the case individuals from the gross population of the case individuals comprises grouping together fourth case individuals randomly selected from the gross population of the case individuals to form the second test sub-population of the case individuals, wherein the third case individuals are exclusive from the fourth case individuals, wherein the fourth case individuals are associated with the at least one first sub-population feature and the at least one second sub-population feature, and wherein the third case individuals and the fourth case individuals together comprise the second sub-population of the case individuals;

presenting second control content to the second control sub-population of the case individuals, wherein the second control content is selected according to the first statistical model;

measuring a second control sub-population average feedback metric based on a second control content feedback provided from the second control sub-population of the case individuals in response to being presented the second control content;

presenting a second test content to the second test sub-population of the case individuals, wherein the second test content is selected according to a third statistical model different than the first statistical model and the second statistical model;

measuring a second test sub-population average feedback metric based on a second test content feedback from the second test sub-population of the case individuals in response to being presented the second test content; and determining that the second test sub-population average feedback metric exceeds the second control sub-population average feedback metric of the second control sub-population of the case individuals; and determining that a probability value for a difference between the second test sub-population average feedback metric and the second control sub-population average feedback metric is less than the predetermined significance level value.

16. The method of claim 12, wherein:

the first version of the website is selected according to the first statistical model; and the second version of the website is selected according to the second statistical model.

17. The method of claim 12, wherein:

measuring, using the optimization algorithm of the feature learning system, the first control sub-population average feedback metric based on the first control content feedback provided from the first control sub-population of the case individuals further comprises an average feedback metric variance threshold value that comprises one of:

an average click-through-rate threshold value;

an average orders per session threshold value; or average revenue per session threshold value.

18. The method of claim 12, wherein:

the gross population of the case individuals comprise people performing a same action.

19. The method of claim 11, wherein:

the at least one first sub-population feature comprises at least one of a gender, an age, a browsing act, or a purchase history.

20. The method of claim 12, wherein:
the first statistical model comprises one of a linear regression, a logistic regression, a Poisson regression, or a hierarchical tree-based regression; and
the second statistical model comprises an other one of the linear regression, the logistic regression, the Poisson regression, or the hierarchical tree-based regression.

* * * * *